United States Patent
LeMay et al.

(10) Patent No.: US 9,805,194 B2
(45) Date of Patent: Oct. 31, 2017

(54) MEMORY SCANNING METHODS AND APPARATUS

(71) Applicant: Intel Corporation, Santa Clara, CA (US)

(72) Inventors: Michael LeMay, Hillsboro, OR (US); David M. Durham, Beaverton, OR (US); Men Long, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/671,764

(22) Filed: Mar. 27, 2015

(65) Prior Publication Data

US 2016/0283717 A1  Sep. 29, 2016

(51) Int. Cl.
*G06F 11/00*  (2006.01)
*G06F 21/56*  (2013.01)
*G06F 12/0802*  (2016.01)
*G06F 12/1009*  (2016.01)

(52) U.S. Cl.
CPC ........ *G06F 21/567* (2013.01); *G06F 12/0802* (2013.01); *G06F 12/1009* (2013.01); *G06F 21/564* (2013.01)

(58) Field of Classification Search
CPC ............... G06F 21/567; G06F 12/1009; G06F 12/0802; G06F 2221/034
See application file for complete search history.

(56) References Cited

U.S. PATENT DOCUMENTS

| | | | |
|---|---|---|---|
| 8,888,585 B1* | 11/2014 | Beechey | A63F 13/10 463/29 |
| 8,966,226 B2* | 2/2015 | Conti | G06F 21/82 712/220 |
| 2004/0205379 A1 | 10/2004 | Hilland et al. | |
| 2008/0141375 A1 | 6/2008 | Amundsen | |
| 2009/0182976 A1* | 7/2009 | Agesen | G06F 12/1009 711/207 |
| 2009/0328042 A1* | 12/2009 | Khosravi | G06F 21/74 718/100 |
| 2011/0296525 A1 | 12/2011 | Turbin | |
| 2012/0174225 A1 | 7/2012 | Shyamsunder et al. | |

(Continued)

OTHER PUBLICATIONS

Reader, "Mozilla releases open-source memory-scanning technology (for servers, not brains)," Mar. 12, 2015, http://venturebeat.com/category/security, accessed on Apr. 27, 2015, 4 pages.

(Continued)

*Primary Examiner* — Mohammed Waliullah
(74) *Attorney, Agent, or Firm* — Hanley, Flight & Zimmerman, LLC

(57) ABSTRACT

Memory scanning methods and apparatus are disclosed. An example apparatus includes a walker to traverse a paging structure of an address translation system; a bit analyzer to determine whether a bit associated with an entry of the paging structure is indicative of the entry being recently accessed; an address identifier to, when the bit analyzer determines that the bit associated with the entry of the paging structure is indicative of the entry being recently accessed, determine an address associated with the entry; and an outputter to provide the determined address to a memory scanner.

25 Claims, 9 Drawing Sheets

(56) References Cited

U.S. PATENT DOCUMENTS

2013/0326143 A1 12/2013 Chen
2014/0189881 A1* 7/2014 Lindsay ................. G06F 21/60
  726/27

OTHER PUBLICATIONS

International Searching Authority, "International Search Report and Written Opinion," issued in connection with International Patent Application No. PCT/US2016/016355, mailed May 19, 2016, 14 pages.

* cited by examiner

MEMORY SCANNING METHODS AND APPARATUS

FIELD OF THE DISCLOSURE

This disclosure relates generally to computing platforms and, more particularly, to memory scanning methods and apparatus.

BACKGROUND

Malware detection techniques include scanning memory for patterns or signatures known to be indicative of malware.

DETAILED DESCRIPTION

Figure 1:
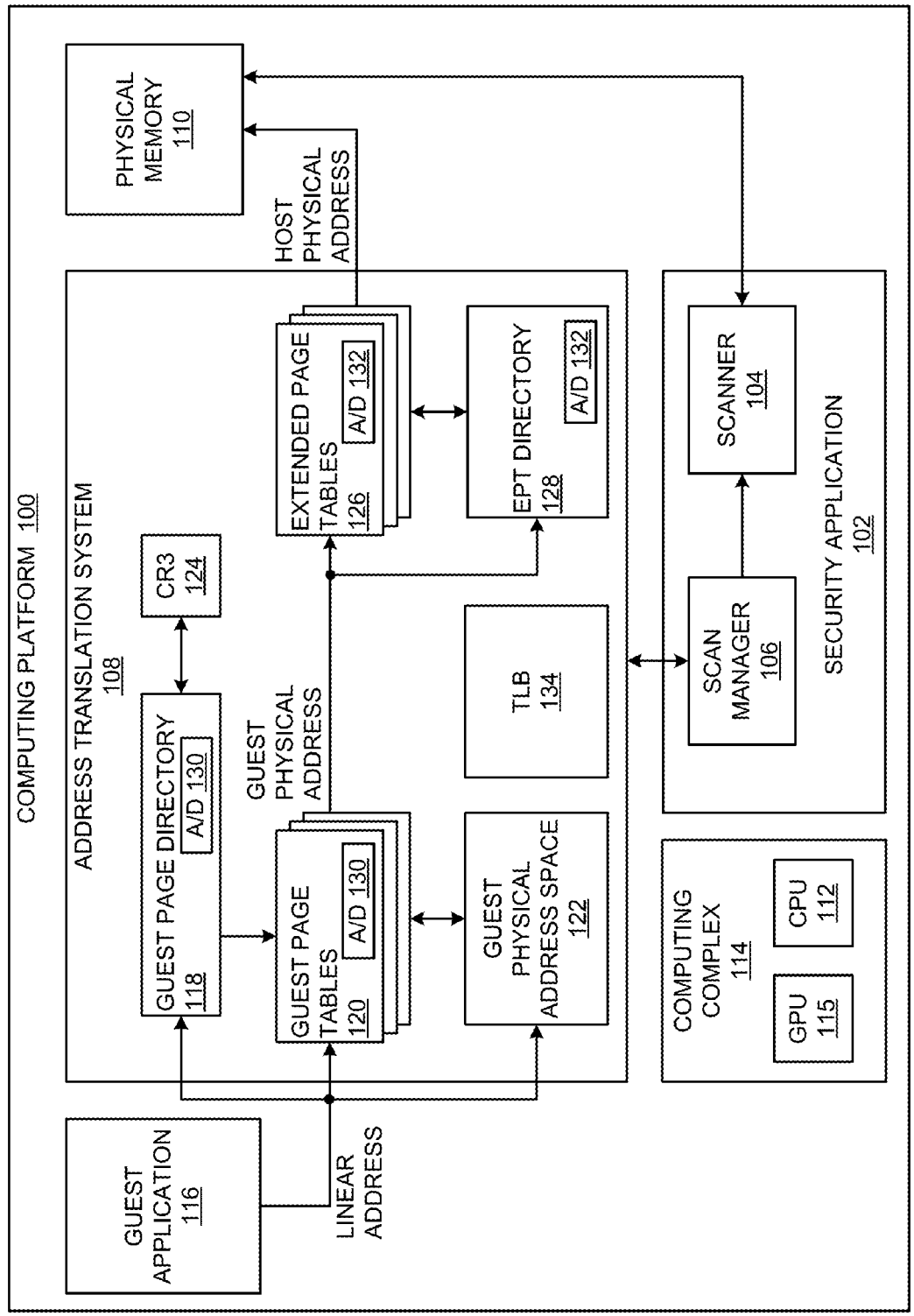
FIG. 1 is an illustration of an example computing platform constructed in accordance with teachings of this disclosure.

Malware detection systems and/or techniques involve scanning elements of a computing platform (e.g., files stored on a disk) for signatures (e.g., patterns) known to correspond to malicious elements (e.g., malware, suspicious communications, viruses, etc.). To avoid detection, some malware disguises itself such that detection of the malware while the malware is inactive is difficult. One such technique of disguising malware involves packing. When packed, the malware is disguised such that the malware does not demonstrate, at least while packed, a signature that alerts the malware detection system to the presence of the malware on the computing platform. Packing obfuscates original code of the malware by compressing the original code and keeping the original code compressed while the malware is inactive. Typically, to be able to attack the computing platform, the malware needs to be unpacked. Approaches exist for scanning system memory for malware that is in the process of being unpacked or otherwise active and attacking the computing platform. However, these approaches involve high overhead and long scan intervals due to, for example, the large amount of memory that needs to be scanned and the timing of the scanning likely coinciding with other applications and/or processes actively utilizing processing resources. That is, detecting malware that is being unpacked or is in the process of attacking the computing platform is computationally expensive and often negatively affects performance, user experience, battery life, throughput, etc.

Example methods and apparatus disclosed herein improve malware detection systems and/or techniques by focusing memory scans (e.g., for malware-indicative patterns) on regions of memory that have recently (e.g., currently and/or within a threshold amount of cycles or time) been accessed (e.g., read and/or modified). Put another way, example methods and apparatus disclosed herein improve malware detection systems and/or techniques by identifying specific regions of memory that have recently been accessed and limiting one or more memory scans to those recently accessed specific regions of memory.

A region of memory that has not recently been accessed is less likely to include malware than another region of memory that has been recently accessed. For example, the recently accessed region of memory is more likely to have been modified since a previous scan than the region of memory that has not been recently accessed. As such, example methods and apparatus disclosed herein avoid wasteful consumption of computing resources otherwise incurred by scanning memory that has not been recently accessed. Example methods and apparatus disclosed herein focus memory inspection on recently accessed memory regions, rather than indiscriminately scanning memory. Accordingly, example techniques disclosed herein are referred to as On-Demand Deep Memory Inspection (OD-DMI).

Examples disclosed herein utilize aspects of memory management systems, such as an address translation system, to identify recently accessed regions of memory on which one or more scans can be focused (e.g., restricted to). Generally, an address translation system provides a conceptually larger address space than is physically available on a particular machine, thereby providing components (e.g., virtual components such as guest applications) a larger address space in which to operate. Address translation systems often utilize paging structures (e.g., page tables, page directories, etc.) to translate a virtual address (e.g., a linear address) into a physical address (e.g., a guest physical address and/or a host physical address). Operations of example address translation systems are described in detail below. Examples disclosed herein interact with (e.g., analyze, monitor, and/or modify) one or more components of the address translation system to efficiently determine which regions of memory have been recently accessed. In some examples disclosed herein, one or more particular bits or flags (e.g., accessed and/or dirty bits) of the paging structures are utilized to identify recently accessed regions of memory and/or candidates for further consideration as recently accessed memory. Additionally or alternatively, examples disclosed herein monitor activity of a translation-lookaside buffer (TLB), to identify recently accessed regions of memory and/or candidates for further consideration as recently accessed memory.

Examples disclosed herein provide a scanner with the knowledge of which regions of memory have been recently accessed, thereby enabling the scanner to focus one or more memory scans on specific regions of memory, thereby conserving resources and enabling faster scans. Moreover, examples disclosed herein recognize that malware-indicative patterns or signatures may span page boundaries. Accordingly, examples disclosed herein identify one or more adjacencies associated with the identified recently accessed regions of memory. Examples disclosed herein utilize the identified adjacencies to guide the memory scans into regions of memory in which the malware-indicative patterns may have spanned a boundary.

Thus, example method and apparatus disclosed herein utilize information associated with address translation and/or memory management systems to restrict one or more memory scans to recently accessed region(s) of memory and/or region(s) adjacent to the recently accessed region(s). Put another way, example methods and apparatus disclosed herein utilize information associated with address translation and/or memory management systems to enable one or more memory scans that omit region(s) of memory that have not been recently accessed. As an amount of memory to be scanned is significantly reduced via example methods and apparatus disclosed herein, corresponding memory scans consume less resources (e.g., processing resources and/or active memory), are less likely to result in false negatives, and will more quickly identify, for example, malware-indicative patterns.

FIG. 1 illustrates an example computing platform 100 in which examples disclosed herein may be implemented. The example computing platform 100 of FIG. 1 includes a security application 102 that provides one or more security measures for the example computing platform 100. The example security application 102 of FIG. 1 includes a scanner 104 and a scan manager 106 constructed in accordance with teachings of this disclosure. The example security application 102 of FIG. 1 is tasked with protecting the example computing platform 100 from malware. The example security application 102 of FIG. 1 maintains a plurality of malware-indicative patterns that have been identified (e.g., by a developer of the security application 102) as potentially corresponding to the computing platform 100 being infected with, for example, malware. Example malware to which the example malware-indicative patterns correspond includes obfuscated (e.g., encrypted and/or packed) files, polymorphic malware, and/or file-less malware such as Internet worms, browser exploits, and/or malicious code utilizing reflective DLL (dynamic link library) injection techniques. In the illustrated example of FIG. 1, the malware-indicative patterns utilized by the example security application 102 are populated (e.g., via communication with a server over a network) by, for example, an entity associated with the security application 102 such as, for example, a developer of the security application 102.

As disclosed in detail below in connection with FIG. 2, the example scan manager 106 of FIG. 1 interacts with an example address translation system 108 of the computing platform 100 to identify region(s) of a physical memory 110 that have recently been accessed (e.g., read and/or written to). Further, the example scan manager 106 of FIG. 1 identifies memory region(s) adjacent to the recently accessed region(s). The example scan manager 106 of FIG. 1 provides the scanner 104 with identifying information (e.g., addresses) associated with the identified recently accessed region(s) of the physical memory 110 and the corresponding adjacent region(s). The example scanner 104 of FIG. 1 uses the received identifier(s) to limit or restrict one or more memory scans to the corresponding region(s) of, for example, the physical memory 110. Put another way, the example scan manager 106 enables the scanner 104 to include recently accessed portion(s) of the physical memory 110 in memory scan(s) and to omit other, not recently accessed portions from the memory scan(s), thereby significantly reducing how much of the physical memory 110 is scanned. As noted above, portions of memory that have not been recently accessed are less likely to be affected by malware because, for example, a previous scan would have likely found any malware residing in those region(s). By enabling the example scanner 104 to scan less memory and to focus such scans on memory more likely (e.g., relative to memory that has not been recently accessed) to include malware-indicative patterns, the example scan manager 106 improves performance of the scanner 104 and the computing platform 100.

Moreover, in some examples, the scan manager 106 alleviates a processing load placed on a central processing unit (CPU) 112 of a computing complex 114 of the example computing platform 100 by assigning one or more tasks or operations associated with the security application 102 to one or more co-processors such as, for example, a graphics processing unit (GPU) 115. That is, the example scan manager 106 of FIG. 1 may delegate or offload some computing task(s) to the co-processor(s) (e.g., the GPU 115) rather than relying on the CPU 112 to execute all of the computing task(s) implemented by the security application 114. By utilizing different processing resources (e.g., the CPU 112 and/or one or more co-processors such as the GPU 115), the example scan manager 106 of FIG. 1 enables more efficient and more aggressive scans (e.g., more frequent scans, more comprehensive scans in terms of number of tested patterns, and/or more extensive scans in terms amounts of memory scanned) relative to systems that utilize and burden only the CPU 112 with execution of security tasks.

An example implementation of the scan manager 106, example interactions between the scan manager 106 and the address translation system 108, and example delegations of security task(s) to co-processor(s) by the scan manager 106 are disclosed in detail below in connection with FIG. 2.

The example address translation system 108 of FIG. 1 provides virtual components (e.g., virtual machines, guest applications, a virtual machine monitor (VMM), guest operating systems, etc.), one of which is shown in FIG. 1 as a guest application 116, with a virtual view or perspective of the physical memory 110. The virtual view of the physical memory 110 simulates an address space in which operations may be performed that is larger than the physical memory 110. While the example of FIG. 1 includes the guest application 116, the example computing platform 100 may include additional or alternative types(s) of virtual components. Further, while the example security application 102 and the example scan manager 106 are described below in connection with the guest application 116 of FIG. 1, the example security application 102 and the example scan manager 106 can be utilized in connection with additional or alternative type(s) of virtual components.

To support virtualization of the physical memory 110, the example address translation system 108 of FIG. 1 utilizes an Extended Page Table (EPT) mechanism or feature. As such, when the guest operating system 116 performs an operation involving memory, the guest application 116 provides a corresponding linear address to the address translation system 108, which translates the linear address into a guest physical address, and the guest physical address into a host physical address. The linear address provided by the guest operating system 116 represents a location in memory from the perspective of the guest application 116. To convert the linear address into the guest physical address, the example address translation system 108 of FIG. 1 includes guest paging structures, namely a guest page directory 118 and guest page tables 120. In the illustrated example of FIG. 1, the guest paging structures are hierarchical paging structures. The guest page tables 120 represent a plurality of hierarchies in which a present entry of one of the guest page tables 120 includes either an address that corresponds to another one of the guest page tables 120 or an address that corresponds to a frame in a guest physical address space 122. Put another way, entries of the guest page tables 120 either reference another paging structure or map a page (e.g., of the guest physical address space 122). Thus, the example guest tables 120 are traversed to find a guest physical address in the guest physical address space 122.

In the illustrated example of FIG. 1, a designated control register (CR3) 124 is used to locate the guest page directory 118. When converting the received linear address, a first portion of the linear address is used together with the CR3 124 to obtain a location in the guest page directory 118. The location in the guest page directory 118 is used to locate a particular one of the guest page tables 120. A second portion of the linear address is used to identify an entry in the located one of the guest page tables 120. In some examples, depending on a paging mode of the address translation system 108 (e.g., 32-bit paging, IA-32 e paging, PAE paging, and/or any other paging mode) the identified entry in the located one of the guest page tables 120 may reference another one of the guest page tables 120. If so, the referenced one of the guest page tables 120 is accessed. The guest page tables 120 are traversed until an entry that maps a page of the guest physical address space 122 is encountered (or until it is determined that a miss has occurred). When an entry in the guest page tables 120 that maps a page of the guest physical address space 122 is encountered, that entry is used (e.g., in combination with a third portion of the linear address) to identify the guest physical address in the guest physical memory 122 corresponding to the received linear address.

In the illustrated example of FIG. 1, the guest physical address obtained via the guest paging structures is provided to EPT paging structures, namely extended page tables (EPTs) 126 (e.g., Intel® VT-x2 Extended Page Tables) and an EPT directory 128. While the example of FIG. 1 includes the EPTs 126 and the EPT directory 128, additional or alternative second-level paging is possible. The example EPTs 126 and the example EPT directory 128 convert the guest physical address to a host physical address that corresponds to a region in the physical memory 110. The translation performed by the example EPTs 126 and the example EPT directory 128 is similar to the translation performed by the example guest paging structures described above in that the EPTs 126 are hierarchically arranged and are traversed until one of the entries of the EPTs 126 maps a page. However, for the EPT paging structures, the mapped page corresponds to an address in the physical memory 110. In the illustrated example, a first portion of the guest physical address is used (e.g., together with an EPT pointer) to obtain a location in the EPT directory 128. The location in the EPT directory 128 is used to locate one of the EPTs 126. A second portion of the guest physical address is used to identify an entry in the located one of the EPTs 126. In some examples, depending on a paging mode of the address translation system 108, the identified entry in the located one of the EPTs 126 may reference another one of the EPTs 126. If the identified entry in the located one of the EPTs 126 references another one of the EPTs 126, that next EPT 126 is accessed. When the entry of the EPTs 126 at which the traversal has arrived maps a page of the physical memory 110, rather than referencing another paging structure, that entry is used to identify the host physical address in the physical memory 110. Thus, the linear address received at the address translation system 108 is translated through the guest paging structures and the EPT paging structures into the host physical address, and the operation (e.g., a read or write) corresponding to the linear address is performed in the physical memory 110.

In the illustrated example of FIG. 1, the address translation system 108 supports guest accessed and dirty bits (A/D bits) 130 for the guest paging structures (e.g., the guest page tables 120 and the guest page directory 118) and EPT A/D bits 132 for the EPT paging structures (e.g., the EPT directory 128 and the EPTs 126). In the illustrated example of FIG. 1, individual ones of the EPT bits 132 correspond to individual entries of the EPT paging structures. Accordingly, the EPT A/D bits 132 are set when the corresponding entries in the EPT paging structures are accessed. For example, during the traversal of the EPT directory 128 and the EPTs 126 described above to translate the guest physical address into the host physical address, one or more entries in the EPT directory 128 and the EPTs 122 are accessed. During this traversal, the EPT A/D bits 132 corresponding to the traversed entries are set to indicate that those entries were involved in an address translation. Thus, for any EPT paging structure entry that is used during the translation of the guest physical address to the host physical address, the corresponding one of the EPT A/D bits 132 is set (e.g., to '1'). In some examples, an "accessed" one of the EPT A/D bits 132 corresponds to the entry being read or written, and a "dirty" one of the EPT A/D bits 132 corresponds to a write at the entry.

During the traversal of the guest paging structures (e.g., the guest page directory 118 and the guest page tables 120 described above to translate the linear address to the guest physical address, one or more entries in the guest paging structures are accessed. During this traversal, the guest A/D bits 130 corresponding to the traversed entries are set (e.g., to '1') to indicate that those entries were involved in an address translation. Thus, for any entry in the guest paging structures that is used during the translation of the linear address to the guest physical address, the corresponding one of the guest A/D bits 130 is set. In some examples, an operating system may additionally or alternatively modify the guest A/D bits 130.

As disclosed in detail below in connection with FIG. 2, the example scan manager 106 of FIG. 1 uses the guest A/D bits 130 and/or the EPT A/D bits 132 to identify recently accessed memory.

In the illustrated example of FIG. 1, a translation-lookaside buffer (TLB) 134 is used to cache mappings indicative of the translations performed by the guest paging structures and the EPT paging structures. The example TLB 134 of FIG. 1 stores the mappings such that, should the address translation system 108 be called to perform the same translation again, the result of the translation can be readily retrieved from the TB 134, rather than having to re-traverse the paging structures. As disclosed in detail below in connection with FIG. 2, the example scan manager 106 of FIG. 1 utilizes the TLB 134 to identify recently accessed memory.

Figure 2:
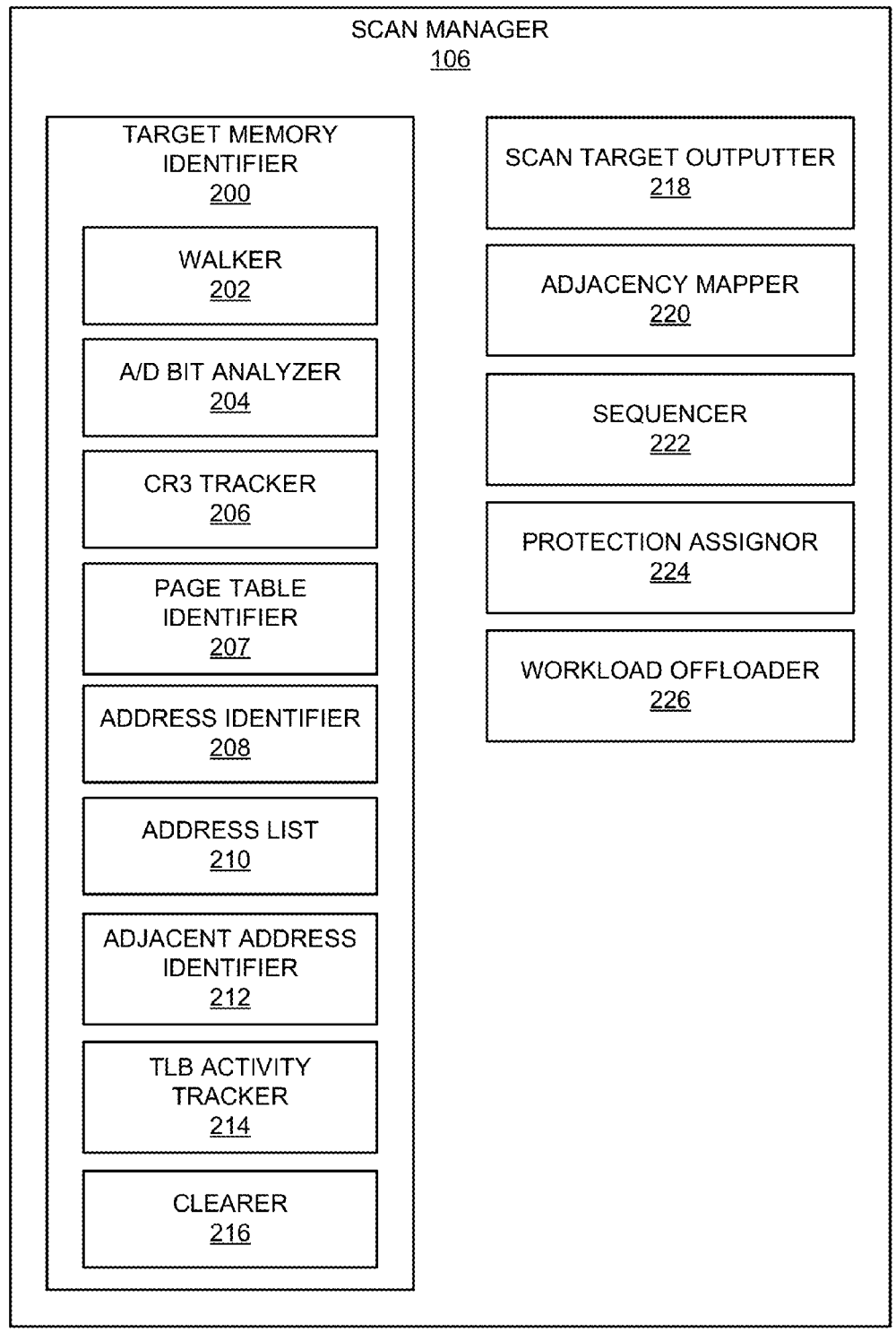
FIG. 2 is a block diagram of an example implementation of the example scan manager of FIG. 1.

FIG. 2 illustrates an example implementation of the example scan manager 106 of FIG. 1. The example scan manager 106 of FIG. 2 includes a target memory identifier 200 to identify recently accessed region(s) of memory based on information associated with one or more aspects of the example address translation system 108 of FIG. 1. The example target memory identifier 200 of FIG. 2 includes a walker 202 to traverse the paging structures of the address translation system 108. Further, the example target memory identifier 200 of FIG. 2 includes an A/D bit analyzer 204 to gather information associated with entries of the paging structures being traversed by the walker 202. For example, the walker 202 of FIG. 2 traverses the EPTs 126 and/or the EPT directory 128, and the example A/D bit analyzer 204 determines (e.g., during and/or after the traversal) which of the paging structure entries has set EPT A/D bits 132. That is, the example walker 202 and the example A/D bit analyzer 204 of FIG. 2 determine which one(s) of the EPT A/D bits 132 is/are set (e.g., to '1') at a particular time. To determine which one(s) of the guest A/D bits 130 is/set (e.g., to '1') at a particular time, the example walker 202 traverses, for example, the guest page directory 118 and the guest page tables 120, and the example A/D bit analyzer 204 of FIG. 2 determines which one(s) of the guest A/D bits 130 is/are set. In some examples, the A/D bit analyzer 204 considers the A/D bits 130, 132 set when the accessed bit is set. In some examples, the A/D bit analyzer 204 considers the A/D bits 130, 132 set when the dirty bit is set. In some examples, the A/D bit analyzer 204 considers the A/D bits 130, 132 set when the accessed bit or the dirty bit is set.

In some examples, the scanner 104 maintains a cache of the EPT A/D bits 132. In some examples, when the walker 202 and/or the A/D bit analyzer 204 are determining whether one or more of the EPT A/D bits 132 is set, the example walker 202 and/or the A/D bit analyzer 204 references the cache to determine if the cache includes a corresponding entry. If so, that entry can be used to determine a value of the EPT A/D bit 132. In some examples, when the cache is used to determine the value of the EPT A/D bit 132, the EPT A/D bit 132 is cleared and the corresponding entry in the TLB 134 is evicted so that subsequent page table accesses will be detected and processed in subsequent scans.

In some examples, the walker 202 starts a traversal of the paging structures with a root entry (e.g., a highest entry in the corresponding hierarchy), such as a root one of the EPTs 126 or an entry in the EPT directory 128, and proceeds through the hierarchy according to the corresponding values. In the illustrated example of FIG. 2, the target memory identifier 200 includes a CR3 tracker 206 to identify one or more root entries of the paging structures that correspond to recently active processes, threads, or programs. In particular, the example CR3 tracker 206 of FIG. 2 maintains (e.g., in conjunction with a virtual machine monitor (VMM)) a collection (e.g., a list) of values recently (i.e. since the previous scan) used in the CR3 124 of FIG. 1. The values of the CR3 124 point to a beginning of the root paging structures corresponding to active process, threads, programs, etc. and, thus, the CR3 tracker 206 maintains the values as indications of which portions of the paging structures are recently active. In the illustrated example, the CR3 tracker 206 utilizes a bitvector to track the CR3 values. For example, the VMM can monitor which CR3 values have recently been used and the CR3 tracker 206 can define a bitvector with a bit assigned to the individual pairs of hardware threads and CR3 values. When a particular CR3 value is loaded into the CR3 124 on a hardware thread, the corresponding one of the bits is set by the CR3 tracker 206. When the CR3 register on that hardware thread is subsequently loaded with a different value, the corresponding bit for the previous value is cleared. This is useful for detecting when a CR3 value is still in use on any hardware thread at the time the CR3 value is used as a starting point for a scan. If it is, it should be retained in the list of recently-used CR3 values. Otherwise, it should be removed from the list of recently-used CR3 values. Thus, in the illustrated example of FIG. 2, the values provided by the CR3 tracker 206 of FIG. 2 are used by the walker 202 as starting points indicative of which hierarchies of the paging structures are to be traversed. Put another way, when a scan is to be performed, the collection of CR3 values serves as an indication of which paging structure hierarchies should be checked, for example, for indications of recent access. When a value of the CR3 124 is replaced, the example CR3 tracker 206 clears the corresponding value from the collection of CR3 values, thereby omitting CR3 values that correspond to inactive threads, processes, etc. from the collection. In some examples, the CR3 tracker 206 utilizes a target list processor feature to reduce a frequency of CR3 load exits. Additionally or alternatively, the example CR3 tracker 206 can obtain a list of all valid CR3s (e.g., from an operating system) and can use EPT A/D bits to determine which of those CR3s have been used recently.

The example target memory identifier 200 of FIG. 2 includes a page table identifier 207. In addition to or in lieu of maintaining the list of active CR3 values, the example page table identifier 200 of FIG. 2 may scan all of memory for pages that are formatted like a page table structure. For example, some processors do not support a sufficiently large physical address space to permit physical addresses that would completely fill the address field in page table entries. Thus, some bits in predictable location in page table entries (e.g., 64-bit entries) will be zero. Scanning for such patterns via the example page table identifier 207 of FIG. 2 could obviate the need for obtaining the list of active CR3 values. That is, active paging structures can be identified by scanning memory for bit patterns indicative of paging structure hierarchies. Results of such scans performed by the example page table identifier 207 of FIG. 2 can be used as starting points for, for example, the example walker 202 of FIG. 2. The results of such a scan for paging structures could be refined to reduce false matches by checking for references from entries in each possible page table to the addresses of other possible page tables.

In some examples, as the walker 202 traverses the paging structures, when the walker 202 encounters a paging structure entry for which the corresponding one of the A/D bits 130, 132 is not set (e.g., is clear or '0'), as determined by the A/D bit analyzer 204, the walker 202 ceases the traversal through that hierarchy and, if any paging structures remain un-walked, returns to, for example, another root entry from which a subsequent traversal begins. For example, the walker 202 of FIG. 2 can recursively traverse the paging structures. In some examples, the walker 202 maintains a list of page tables previously walked during a scan and avoid walks a same page table more than once in a single scan. In some examples, the walker 202 uses one or more criterion to filter out certain page table entries from being walked. For example, the walker 202 may avoid walking page table entries that are only usable for supervisor-mode accesses. In some examples, the walker 202 avoids walking page tables that are purportedly located in non-RAM regions as reported by, for example, BIOS and/or other mechanisms of a computing platform. An indication that a page table is located in a non-RAM region is likely due to a page table being accessed after that page table has actually been reclaimed and reused for other purposes by the operating system, resulting in arbitrary memory data being incorrectly interpreted as page table entries that, thus, point to arbitrary memory regions.

In some examples, the walker 202 traverses all of the paging structures (e.g., all entries of the EPT directory 128 and all pages of the EPTs 126) and the A/D bit analyzer 204 and/or the walker 202 generates a summary (e.g., a table, a list, or any other suitable type of data structure) of the currently set A/D bits 130, 132. The summary generated by the example walker 202 of FIG. 2 includes information regarding the paging structure entries that have the corresponding A/D bits 130, 132 set. The information of the summary generated by the example walker 202 of FIG. 2 indicates, for example, a guest physical address corresponding to an entry having a set EPT A/D bit 132. In some examples, the summary generated by the walker 202 and/or the A/D bit analyzer 204 is generated at an onset of a process of identifying recently accessed memory. In such examples, the summary can serve as a starting point for the process and/or can be referenced throughout the process of identifying recently accessed memory. Alternatively, the walker and the A/D bit analyzer 204 can obtain the information of the A/D bits 132 in an on-demand manner throughout the process of identifying recently accessed memory.

The example target memory identifier 200 of FIG. 2 includes an address identifier 208 to populate an address list 210 based on, for example, the information gathered by the example A/D bit analyzer 204. In the illustrated example of FIG. 2, the address identifier 208 uses the set EPT A/D bits 130, 132 (e.g., as determined by the A/D bit analyzer 204) to identify corresponding physical addresses (e.g., addresses corresponding to regions of the guest physical address space 122 and/or corresponding regions of the physical memory 110) that have been recently accessed. In the illustrated example of FIG. 2, the address identifier 208 determines which entries of the EPTs 126 have a set A/D bit 132 and map a page in the physical memory 110, as opposed to referencing another paging structure (e.g., another EPT table entry). The example address identifier 208 of FIG. 2 determines that the physical addresses (e.g., guest physical addresses) associated with those entries of the EPTs 126 (e.g., entries of the EPTs 126 that have a set A/D bit 132 and map a page) correspond to recently accessed region(s) of memory. Further, the example address identifier 208 of FIG. 2 determines linear addresses through which the scanner can access each of the physical addresses that are determined to correspond to recently accessed region(s) of memory. In some examples, to determine the linear address corresponding to the identified physical address, the address identifier 208 adds a predetermined offset to the physical address to arrive at the linear address. In such examples, the predetermined offset is maintained for purposes of the determination of the linear address by the address identifier 208.

The example address identifier 208 of FIG. 2 populates the address list 210 with the linear addresses determined by the example address identifier 208. Accordingly, the example address list 210 of FIG. 2 includes one or more linear addresses corresponding to recently accessed memory (e.g., region(s) of the physical memory 110 and/or, from the perspective of the guest application 116, region(s) of the guest physical address space). As described above, because the recently accessed memory is more likely than memory not recently accessed to include malware-indicative patterns, the linear addresses of the address list 210 correspond to target memory to be scanned by, for example, the scanner 104 of FIG. 1.

The example target memory identifier 200 of FIG. 2 includes an adjacent address identifier 212 to identify one or more addresses adjacent to the addresses identified by the address identifier 208 as corresponding to recently accessed memory. Malware-indicative patterns may span boundaries (e.g., page boundaries) in memory. To account for such instances while enabling memory scans focused on particular region(s) of memory (e.g., recently accessed region(s) corresponding to the addresses of the address list 210), the example adjacent address identifier 212 of FIG. 2 selects one or more linear addresses adjacent to each of the linear addresses identified by the address identifier 208 as corresponding to recently accessed memory. For example, when the address list 210 is populated with a first linear address, the example adjacent address identifier 212 of FIG. 2 identifies a second linear address adjacent to the first linear address (e.g., a subsequent linear address or a preceding linear address). In the illustrated example of FIG. 2, the adjacent address identifier 212 adds the second linear address to the address list 210. In some examples, the adjacent address identifier 212 designates (e.g., via a flag or bit) the entry added to the address list 210 as an adjacent address. In some examples, the adjacent address identifier 212 determines whether an identified adjacent address is already present in the address list 210 and, if so, does not add the identified adjacent address to the address list 210 (e.g., to avoid redundancy). As such, in some examples, the address list 210 includes one or more linear addresses corresponding to recently accessed memory and one or more linear addresses adjacent to those linear addresses. As such, when the linear addresses of the address list 210 are output to, for example, the scanner 104 of FIG. 1, the scanner 104 scans the recently accessed memory and at least a portion of an adjacent region of memory such that any malware-indicative patterns spanning the corresponding boundary are detected by the scanner 104.

The example target memory identifier 200 of FIG. 2 includes a TLB activity tracker 214 to identify recently accessed memory. In some examples, the TLB activity tracker 214 of FIG. 2 operates in addition to (e.g., simultaneously with) the example A/D bit analyzer 204 which, as disclosed above, identifies recently accessed memory. In some examples, the TLB activity tracker 214 of FIG. 2 operates as an alternative to the example A/D bit analyzer 204 to identify recently accessed page table entries. As described above, the TLB 134 of FIG. 1 includes mappings from, for example, a linear address to a guest physical address and/or from a guest physical address to a host physical address). The TLB 134 acts as a cache for the address translation system 108 to provide fast access to an address translation that would otherwise be obtained by traversing through the paging structures. In the illustrated example, the TLB 134 is flushed such that the mappings contained in the TLB 134 at a given time correspond to translations that have occurred recently. For example, in the illustrated example of FIG. 1, the scanner 104 clears an entry from the TLB 134 when the corresponding region of memory is scanned such that future accesses to that region of memory are logged in the TLB 134 and such that future scans of that region of memory can be repeated. Accordingly, entries of the TLB 134 correspond to recent memory operations.

The example TLB activity tracker 214 of FIG. 2 tracks the mappings of the TLB 134 to identify, for example, linear addresses of the mappings. Such linear addresses correspond to recently accessed memory and, thus, the example TLB activity tracker 214 of FIG. 2 stores the identified linear addresses. In some examples, the TLB activity tracker 214 utilizes the example address identifier 208 to determine a linear address associated with a mapping of the TLB 134. For example, when the mapping of the TLB 134 includes is from a guest physical address to a host physical address, the example address identifier 208 determines which linear address is associated with the guest physical address. As disclosed above, the address identifier 208 determines the linear address by, for example, adding a predetermined offset to the guest physical address to arrive at the corresponding linear address.

In some examples, the TLB activity tracker 214 maintains a log of entries and evictions from the TLB 134. In such examples, the TLB activity tracker 214 updates the log when an entry is added to the TLB 134 and when an entry is evicted from the TLB 134. In some examples, the TLB activity tracker 214 includes details associated with the addition and/or eviction such as, for example, timing data indicative of when the corresponding was added and/or evicted from the TLB 134. In the illustrated example of FIG. 2, the TLB activity tracker 214 provides the linear addresses corresponding to recently accessed memory to the example address list 210. In some examples, the adjacent address identifier 212 determines adjacent linear address(es) and adds the same to the address list 210. Accordingly, the TLB activity tracker 214 of FIG. 2 provides the address list 210 with linear addresses that correspond to recently accessed memory and, in some examples, linear addresses adjacent to the linear addresses that correspond to recently accessed memory. As disclosed above, in the illustrated example of FIG. 2, the linear addresses of the address list 210 are provided to the scanner 104 such that the scanner 104 focuses one or more memory scans on recently accessed memory and memory adjacent to the recently accessed memory.

Some approaches for virtualizing guest paging use the VMM to monitor the guest linear address mappings that are loaded into the TLB 134. For example, the VMM may shadow guest page tables so that the copy of the page tables modified by the guest software is separate from the copy that is referenced by CR3 124 and used to insert entries into the TLB 134. The VMM may add page table entries to this latter copy on demand, in response to attempts by the CPU 112 to access those page table entries for the purpose of loading TLB entries. The VMM can log such attempts in a similar manner to the TLB activity tracker 214. In some examples, in addition to evicting processor TLB entries after the corresponding memory is scanned, the corresponding page table entries in the copy of the page tables that can be accessed by the CPU 112 for the purpose of loading TLB entries is also removed so that subsequent accesses to the corresponding mapped memory will be noted by the VMM.

The example target memory identifier 200 of FIG. 2 includes a clearer 216 to clear, for example, the guest A/D bits 130 and/or the EPT A/D bits 132. In some examples, to clear the A/D bits 130, 132, the example clearer 216 utilizes a flush of the TLB 134 to perform the clearing of the A/D bits 130, 132. In some examples, such a flush includes sending an interrupt to, for example, hardware threads to invoke such an operation. In some examples, the clearer 216 clears the A/D bits 130, 132 while the example walker 202 and the example A/D bit analyzer 204 are traversing the paging structures and collecting information about the A/D bits 130, 132. In some examples, the clearer 216 clears the A/D bits 130, 132 while reading out memory to be scanned (e.g., to the scanner 104). In some examples, in response to a particular memory region being scanned (e.g., by the scanner 104 of FIG. 1), the clearer 216 clears the corresponding guest A/D bits 130 and/or the corresponding EPT A/D bits 132. Additionally or alternatively, in response to a particular memory region being scanned (e.g., by the scanner 104 of FIG. 1), the example clearer 216 of FIG. 2 evicts the corresponding entry in the TLB 134 of FIG. 1. In some examples, the clearer 216 clears the bits and/or evicts the TLB entries in response to a threshold amount of memory being scanned. For example, if a first memory scan does not scan at least the threshold amount of memory, the example clearer 216 of FIG. 2 may not clear the bits and/or may not evict the TLB entries. On the other hand, if a second memory scan results in the threshold amount of memory being scanned, the example clearer 216 of FIG. 2 clears the bits and/or evicts the TLB entries.

An alternative to maintaining A/D bits in a single EPT hierarchy is to maintain the A/D bits in multiple EPT hierarchies. Guest software, such as the guest application 116, can efficiently switch to an EPT hierarchy with clear A/D bits using, for example, the VMFUNC instruction. The example guest application 116 may perform such a switch when the guest application 116 would otherwise have requested that EPT A/D bits 132 be cleared (e.g., via the clearer 216 of FIG. 2) in the single hierarchy. Periodically, the EPT A/D bits 132 in one or more of the EPT hierarchies would be cleared by, for example, a hypervisor to make them available for guest software to select when the guest software is seeking an EPT hierarchy with clear A/D bits. In some examples, this approach reduces overall overhead by reducing a number of VMM invocations. For example, when the VMM would ordinarily need to be invoked to clear A/D bits, the guest application 116 can instead simply invoke the VMFUNC instruction to switch to an EPT hierarchy that already has clear bits.

Accordingly, the example target memory identifier 200 generates the address list 210 based on information associated with the address translation system 108 of FIG. 1 and, in some examples, interacts with (e.g., manipulates the A/D bits 130, 132 and/or flushes the TLB 134) the address translation system 108 to ensure that the linear addresses of the address list 210 correspond to recently accessed memory. As such, the example address list 210 includes one or more indications of recently accessed memory and its neighboring memory that can be provided to, for example, the scanner 104 of FIG. 1. In the illustrated example of FIG. 2, the scan manager 106 includes a scan target outputter 218 to convey information associated with the address list 210 (e.g., the linear addresses of the address list 210) to the example scanner 104. The example scan target outputter 218 of FIG. 2 sequentially outputs entries of the address list 210 to the scanner 104. However, additional or alternative conveyance techniques can be employed by the example scan target outputter 218.

The example scan manager 106 of FIG. 1 includes an adjacency mapper 220 and a sequencer 222 to condition items of the address list 210 for an improved output to the scanner 104. Put another way, when the example scan target outputter 218 is to sequentially output the contents of the address list 210, the example adjacency mapper 220 and the example output sequencer 222 cooperate to order the contents of the address identifier 208 such that the scanner 104 can more efficiently perform the scan. In some examples, the sequential adjacent memory regions, as determined by the example adjacency mapper 220 and the sequencer 222, are output or fed to the scanner 104 in their entireties.

Figure 3:
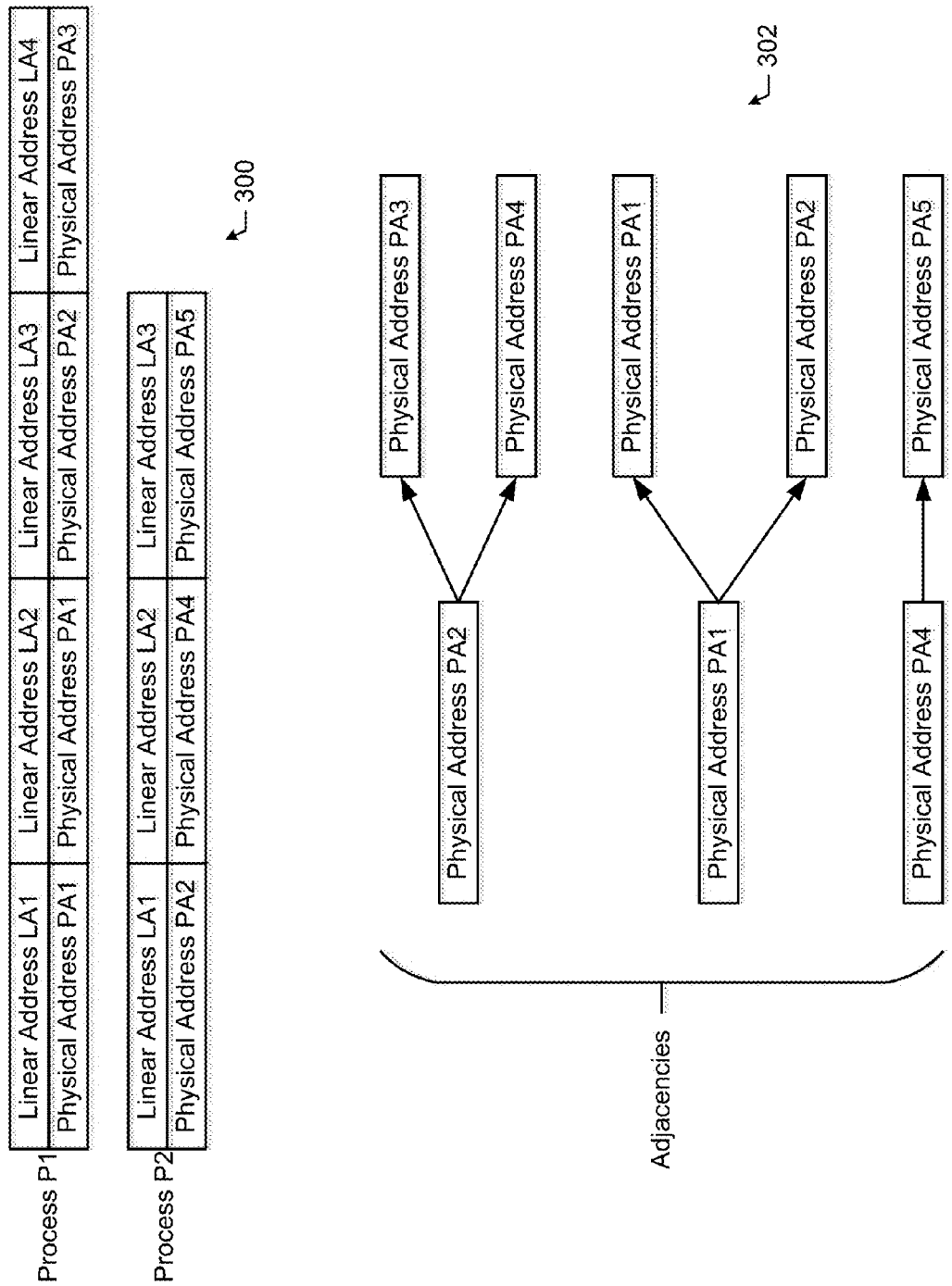
FIG. 3 illustrates example addresses associated with the example adjacency mapper of FIG. 2.

Alternatively, in some examples, the example adjacency mapper 220 and the example output sequencer 222 of FIG. 2 condition the addresses to be scanned such that redundancies are reduced and such that boundaries are effectively scanned without having to scan entire adjacent addresses. In particular, the example adjacency mapper 220 determines which physical address (e.g., of the guest physical address space 122) corresponds to each linear address of the address list 210. Each physical address corresponding to a region of physical memory. FIG. 3 illustrates example mapping determinations 300 made by the example adjacency mapper 220 of FIG. 2 when a first process P1 and a second process P2 are to be scanned. In the example of FIG. 3, for the first process P1, the example adjacency mapper 220 determines that linear address LA1 maps to physical address PA1, that linear address LA2 maps to physical address PA1, that linear address LA3 maps to physical address PA2, and the linear address LA4 maps to physical address PA3. Further, for the second process P2, the example adjacency mapper 220 determines that the linear address LA1 maps to physical address PA2, that linear address LA2 maps to physical address PA4, and that linear address LA3 maps to physical address PA5.

The example adjacency mapper 220 of FIG. 2 uses the mapping determinations 300 to identify adjacencies between the physical addresses from the perspective of the linear addresses. These physical adjacencies 302 as determined by the adjacency mapper 220 are illustrated in FIG. 3. For example, because physical address PA2 is followed by physical address PA3 in Process P1 and by physical address PA4 in Process P2, as indicated in the mapping determinations 300, the adjacency mapper 220 determines that region(s) of memory located at physical address PA3 should be scanned in connection with region(s) of memory located at physical address PA2 and that region(s) of memory located at physical address PA4 should be scanned in connection with region(s) of memory located at physical address PA2. As such, the boundary between physical address PA2 and physical address PA3 will be scanned, thereby detecting malware-indicative patterns that span that boundary. Further, the boundary between physical address PA2 and physical address PA4 will be scanned. In the example of FIG. 3, because physical address PA1 is followed by physical address PA1 in Process P1 and by physical address PA2 in Process P1, as indicated in the mapping determinations 300, the adjacency mapper 220 determines that region(s) of memory located at physical address PA1 should be scanned in connection with region(s) of memory located at physical address PA1 and that region(s) of memory located at physical address PA2 should be scanned in connection with region(s) of memory located at physical address PA1. Elimination of redundancies is disclosed below in connection with FIG. 4. Further, in the example of FIG. 3, because physical address PA4 is followed by physical address PA5 in Process P2, as indicated in the mapping determinations 300, the adjacency mapper 220 determines that region(s) of memory located at physical address PA5 should be scanned in connection with region(s) of memory located at physical address PA4.

In the illustrated example, the sequencer 222 generates one or more sequences to be provided to the scanner 104 based on the information generated and/or obtained by the example adjacency mapper 220. In the illustrated example of FIG. 2, the sequencer 222 aligns the addresses to be provided to the scanner 104 according to the corresponding adjacency information. In some examples, the sequences are provided to the scanner 104 without adjusting for potential redundancies.

Figure 4:
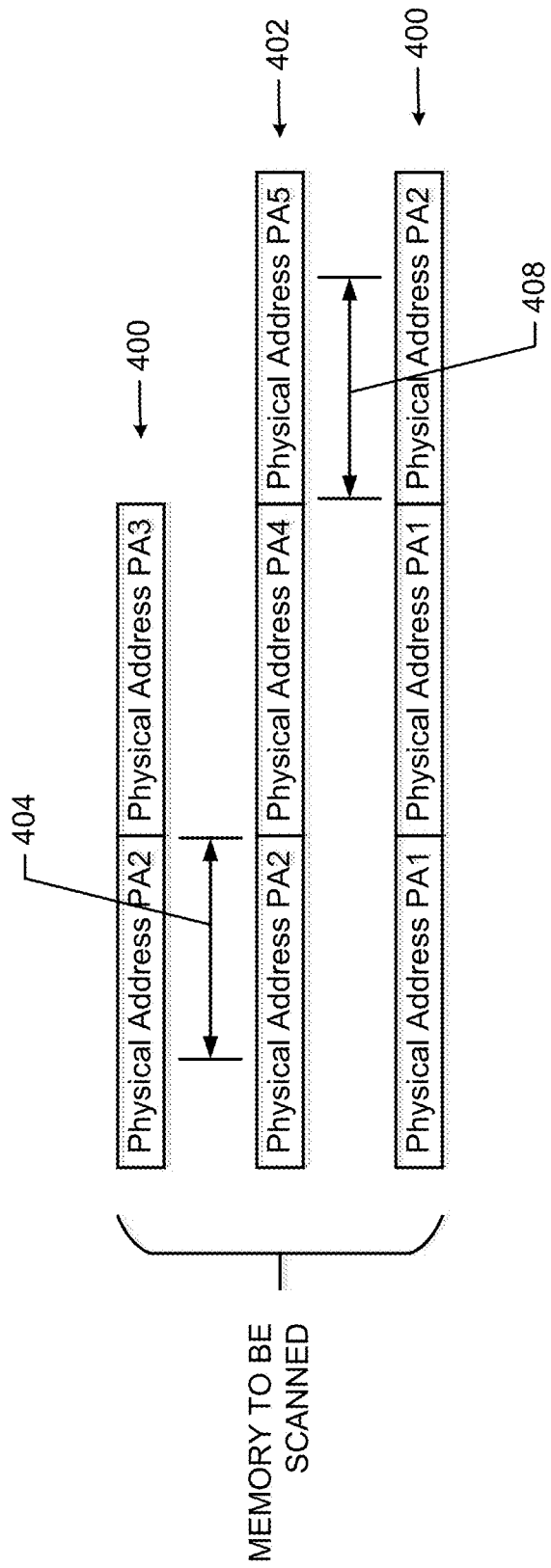
FIG. 4 illustrates example sequences associated with the example sequencer of FIG. 2.

Alternatively, the example sequencer 222 of FIG. 2 can reduce instances of redundant scanning by designating certain portions of the address region for scanning, as opposed to the entire address region. FIG. 4 illustrates example sequences generated by the example sequencer 222 of FIG. 2 based on the adjacency information illustrated in FIG. 3. In the example of FIG. 4, the sequencer 222 is tasked with generating one or more sequences such than region(s) of memory corresponding to linear addresses LA1-LA5 are scanned, along with any corresponding boundaries. The example sequencer 222 of FIG. 2 uses the information obtained by the adjacency mapper 220, such as the physical adjacencies 302 of FIG. 3, to generate the sequences.

In the illustrated example, the sequencer 222 generates a first sequence 400 based on the physical adjacencies 302 of FIG. 3. In the illustrated example, the sequencer 222 includes physical address PA2 in the first sequence 400, along with physical address PA3 due to the indication in the physical adjacencies 302 of FIG. 3 that physical address PA3 follows physical address PA2, as indicated in Process P1. Further, in the illustrated example, the sequencer 222 generates a second sequence 402 beginning with physical address PA2, with physical address PA4 following due to the indication in the physical adjacencies 302 of FIG. 3 that physical address PA4 follows physical address PA2, as indicated in Process P2. Further, the example sequencer 222 of FIG. 2 includes physical address PA5 in the second sequence 402 following physical address PA4 due to the indication in the physical adjacencies 302 of FIG. 3 that physical address PA5 follows physical address PA4, as indicated in Process P2. To reduce an amount of memory scanning dedicating to scanning boundaries, the example sequencer 222 of FIG. 2 designates only a first portion 404 of the region of memory located at physical address PA2 for inclusion in the corresponding scan. In particular, the example sequencer 222 of FIG. 2 determines that physical address PA2 is already present in the first sequence 400 and, thus, the sequencer 404 designates only the first portion 404 of physical address PA2 such that the boundary between physical address PA2 and physical address PA4 is scanned for potentially overlapping malware-indicative patterns. In some examples, a size of the first portion 404 is based on a page size. However, the example sequencer 222 of FIG. 2 can utilize any suitable size and/or sizing strategy for the first portion 404.

In the illustrated example, the sequencer 222 generates a third sequence 406 beginning with physical address PA1, followed by physical address PA1, which is followed by physical address PA2. In some examples, the sequencer 222 eliminates some portion of one of the instances of the region of memory at physical address PA1 to avoid redundancy while still checking for all necessary malware-indicative patterns that span the boundary between the two instances of the region of memory at physical address PA1. For example, a first portion of the first instance of the region of memory of PA1 may be omitted, or a second portion of the second instance of the region of memory at physical address PA1 may be omitted. In the latter case, a new sequence would be started with another second portion of the region of memory at physical address PA1 adequate for detecting all necessary malware-indicative patterns that span the boundary between the region of memory at physical address PA1 and the region of memory at physical address PA2. Further, the example sequencer 222 of FIG. 2 determines that physical address PA2 is already present in the first sequence 400 and, thus, designates only a second portion 408 of the region of memory at physical address PA2 for scanning. In the illustrated example, the region(s) of memory at the physical addresses to be scanned and the corresponding adjacencies are covered by the first, second and third sequences 400, 402, 406. Thus, the example sequencer 222 of FIG. 2 does not generate more sequences for Process P1 and Process P2. In the illustrated example of FIG. 2, when the example sequencer 222 has generated the sequences disclosed above, the sequencer 222 provides the sequences to the scan target outputter 218, which provides the corresponding information to the scanner (e.g., sequentially).

The example scan manager 106 of FIG. 2 includes a protection assignor 224 to assign one or more protection schemes to one or more operations and/or tasks of the example scan manager 106 and/or the example scanner 104. In some examples, the protection assignor 224 of FIG. 2 designates operations of the scan manager 106 for a first protection domain and operations of the scanner 104 for a second protection domain different than the first protection domain. For example, the protection assignor 224 may assign signature matching operations of the scanner 104 to ring 3 protection and memory identification operations of the scan manager 106 in VMX root protection. Additional or alternative assignments to protection domains are possible.

When the example protection assignor 224 of FIG. 2 has assigned memory scanning operations of the scanner 104 to a different protection domain as memory identification operations of the scan manager 106, the example protection assignor 224 facilitates transfer of data access between the different workloads by copying memory or by remapping, for example, virtual addresses. For example, the example protection assignor 224 may utilize a virtual machine monitor (VMM) to directly modify guest page table entries to point to pages to be scanned from a ring 3 scanning process. Alternatively, the example protection assignor 224 (e.g., via the VMM) may modify the EPTs 126 to translate the guest physical addresses backing a buffer in the ring 3 process to point to physical addresses (e.g., in the physical memory 110) to be scanned. In some examples, such as when one or more operations are offloaded to, for example, a coprocessor such as the GPU 115, analogous operations could be performed, such as by modifying Graphics Translation Table (GTT) or Shared Virtual Memory (SVM) entries for the GPU 115, or Intel® VT-d tables for any supported device.

In the illustrated example of FIG. 2, the scan manager 106 includes a workload offloader 226 to assign one or more workloads or tasks associated with the security application 102 to, for example, a coprocessor such as the GPU 115 of FIG. 1. Usage of the CPU 112 for security tasks (e.g., memory scans associated with malware detection) often consumes significant amounts of CPU cycles, which may negatively impact the computing platform in terms of, for example, user-visible performance, battery life, throughput, etc. Offloading one or more computing tasks (e.g., security tasks) to a co-processor, such as the GPU 115, may alleviate, mitigate, and/or eliminate negative impacts of executing computing tasks (e.g., security tasks and/or any other type of computing task(s)) on the CPU 112. Computing tasks offloaded to the co-processor(s) do not consume CPU cycles, thereby reducing the computation burden of the CPU 112 and the amount of power consumed by the CPU 112. As the number of CPU cycles consumed by an application and/or an amount of CPU-related power consumed by the application are often used to measure performance of an application, examples disclosed herein are especially attractive to, for example, independent software vendors (ISVs) and other types of developers required to meet restrictions or limitations (e.g., benchmarks) placed on CPU cycle and/or power consumption. Further, by utilizing different processing resources (e.g., the CPU 112 and/or the GPU 115), the example scan manager 106 of FIG. 1 enables more efficient and more aggressive scans (e.g., more frequent scans, more comprehensive scans in terms of number of tested patterns, and/or more extensive scans in terms of amounts of memory scanned) relative to systems that utilize and burden only the CPU 112 with execution of security tasks.

In some examples, the workload offloader 226 of FIG. 2 designates one or more walks of the paging structures (e.g., the guest page tables 120 and/or the EPTs 126) performed by the example walker 202 for execution on the GPU 115. The example workload offloader 226 of FIG. 2 grants access to the paging structures of the address translation system 108 by, for example, facilitating a configuration of translation tables and/or page tables that regulate co-processors such as the GPU 115. In the illustrated example of FIG. 1, in which multi-level paging structures are in use, the example workload offloader 226 facilitates granting the GPU 115 access to each of the paging structure levels (e.g., the guest page tables 120 and the EPTs 126).

In some examples, the workload offloader 226 is extended to reduce the CPU utilization imposed by the workload offloader 226 when there is insufficient virtual address space supported by the GPU 115 to simultaneously map, for example, all of the guest page tables 120 and/or the EPTs 126 from the GPU 115. Additionally or alternatively, the extension to the example workload offloader 226 of FIG. 2 reduces CPU utilization when discontinuous physical memory (e.g., of the physical memory 110 of FIG. 2) is mapped in a contiguous virtual address range. For example, the extension to the workload offloader 226 of FIG. 2 can involve granting co-processors such as the GPU 115 access to directly manipulate in-memory translation tables or page tables that grant co-processors such as the GPU 115 access to CPU guest page tables and EPTs and other data and code. In some examples, the example workload offloader 226 can mitigate one or more risks associated with granting of such access by only granting coprocessor access (e.g., access of the GPU 115) to upper-level translation tables (e.g. guest paging structures used with SVM to control GPU memory accesses) and marking security-critical structures read-only or inaccessible with lower-level translation tables (e.g. Intel® VT-d paging structures).

In some examples, to facilitate utilization of, for example, the GPU 115, the example workload offloader 226 activates and/or manages coprocessor-defined mappings. In some examples, this activation involves assistance from the CPU 112 to invalidate stale coprocessor mappings. Additionally or alternatively, coprocessors such as the GPU 104 may generate memory access patterns that result in evictions from the mappings.

A further possible extension would be for the coprocessor to scan all of memory for pages that are formatted like page table structures. For example, current processors do not support a sufficiently large physical address space to permit physical addresses that would completely fill the address field in page table entries. Thus, some bits in predictable locations in 64-bit page table entries will always be zero. Scanning for such patterns could obviate the need for obtaining a list of active CR3s from the CPU. This approach is likely to result in many false positives and negatives, depending on the particular page table pattern criteria in use, but false positives may be reduced by checking for linkages between suspected page tables.

While an example manner of implementing the scan manager 106 of FIG. 1 is illustrated in FIG. 2, one or more of the elements, processes and/or devices illustrated in FIG. 2 may be combined, divided, re-arranged, omitted, eliminated and/or implemented in any other way. Further, the example target memory identifier 200, the example walker 202, the example A/D bit analyzer 204, the example CR3 tracker 206, the example page table identifier 207, the example address identifier 208, the example address list 210, the example adjacent address identifier 212, the example TLB activity tracker 214, the example clearer 216, the example scan target outputter 218, the example adjacency mapper 220, the example sequencer 222, the example protection assignor 224, the example workload offloader 226 and/or, more generally, the example scan manager 106 of FIG. 2 may be implemented by hardware, software, firmware and/or any combination of hardware, software and/or firmware. Thus, for example, any of the example target memory identifier 200, the example walker 202, the example A/D bit analyzer 204, the example CR3 tracker 206, the example page table identifier 207, the example address identifier 208, the example address list 210, the example adjacent address identifier 212, the example TLB activity tracker 214, the example clearer 216, the example scan target outputter 218, the example adjacency mapper 220, the example sequencer 222, the example protection assignor 224, the example workload offloader 226 and/or, more generally, the example scan manager 106 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example target memory identifier 200, the example walker 202, the example A/D bit analyzer 204, the example CR3 tracker 206, the example page table identifier 207, the example address identifier 208, the example address list 210, the example adjacent address identifier 212, the example TLB activity tracker 214, the example clearer 216, the example scan target outputter 218, the example adjacency mapper 220, the example sequencer 222, the example protection assignor 224, the example workload offloader 226 and/or, more generally, the example scan manager 106 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example scan manager 106 of FIG. 1 may include one or more elements, processes and/or devices in addition to, or instead of, those illustrated in FIG. 2, and/or may include more than one of any or all of the illustrated elements, processes and devices.

FIGS. 5-8 are flowcharts representative of example machine readable instructions for implementing the example scan manager 106 of FIGS. 1 and/or 2. In the examples of FIGS. 5-8, the machine readable instructions comprise one or more programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 5-8, many other methods of implementing the example scan manager 106 of FIGS. 1 and/or 2 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 5:
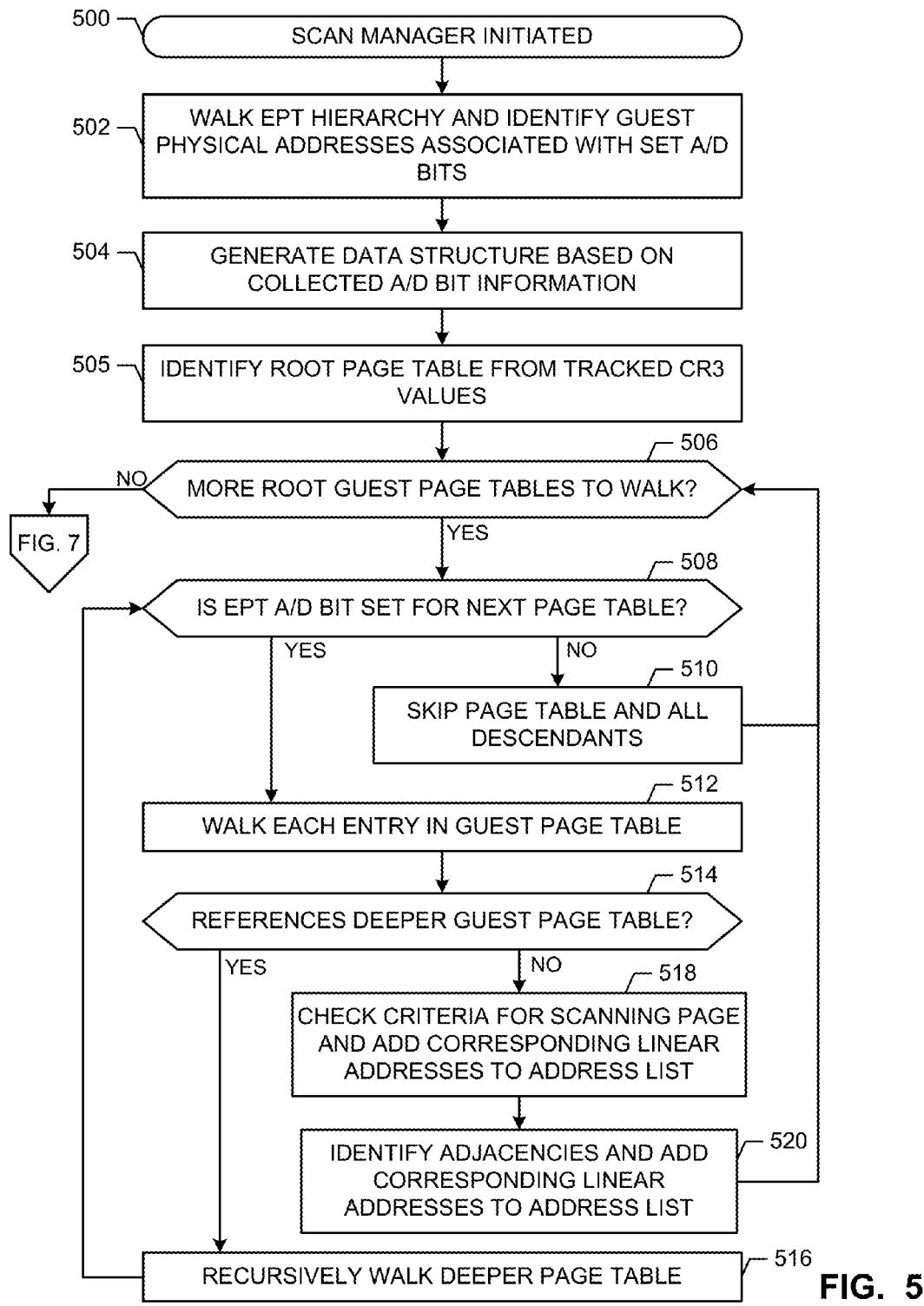
FIG. 5 is a flowchart representative of example machine readable instructions that may be executed to implement the example scan manager of FIGS. 1 and/or 2.

The example of FIG. 5 begins with an initiation of the example scan manager 106 of FIGS. 1 and/or 2 (block 500). The example scan manager 106 is initiated in response to, for example, an instruction from the security application 102, a schedule, and/or one or more other triggers. In the illustrated example of FIG. 5, initiation of the scan manager 106 includes determining under which protection domain(s) the operations are to be performed and which processing component(s) are to perform the operations. In the illustrated example of FIG. 5, the protection assignor 224 indicates under which protection domain the operations of FIG. 5 are to be performed. In some examples, the protection assignor 224 causes one or more of the operations of FIG. 5 to be performed under a first protection domain (e.g., a ring 3 protection level) and one or more of the operations of FIG. 5 to be performed under a second, different protection domain (e.g., via a hypervisor). Additionally, in the illustrated example of FIG. 5, the example workload offloader 226 indicates which processing component (e.g., the CPU 112 and/or the GPU 115) is/are to execute the operations. In some examples, the workload offloader 226 indicates that a first processing component, such as the CPU 112, is to perform one or more of the operations of FIG. 5 and a second, different processing component, such as the CPU 115, is to perform one or more of the operations of FIG. 5.

In the example of FIG. 5, the initiation of the scan manager 500 causes the example target memory identifier 200 to identify one or more regions of memory (e.g., in the physical memory 110) for scanning by the example scanner 104. In the example of FIG. 5, the target memory identifier 200 is to identify region(s) of memory that have recently been accessed based on information associated with the example address translation system 108.

In the example of FIG. 5, the walker 202 of the target memory identifier 200 walks an EPT hierarchy including the corresponding ones of the EPTs 126 (block 502). Further, the A/D bit analyzer 204 analyzes the corresponding EPT A/D bits 132 to determine which addresses of the guest physical address space 122 are associated with recently accessed memory (block 502). In the example of FIG. 5, the A/D bit analyzer 204 generates a data structure based on the analyzed EPT A/D bits 132 (block 504). The data structure indicates which memory region(s) of the guest physical address space 122 have been recently accessed based on, for example, the A/D bit analyzer 204 identifying an end node (e.g., a leaf node) of a paging hierarchy with a set EPT A/D bit 132.

Alternatively, the example TLB activity tracker 214 of the target memory identifier 200 can provide information regarding which addresses of the guest physical address space 122 are associated with recently accessed memory. As described above, the TLB activity tracker 214 logs entries and evictions from the TLB 134 and, thus, contains data indicative of which guest physical addresses have been recently accessed. Accordingly, the TLB activity tracker 214 can provide the data on which the generation of the data structure is based.

In the example of FIG. 5, the CR3 tracker 206 provides location(s) of the root page table(s) of the guest page tables 120 that are candidates as recently accessed memory according to, for example, the data structure generated by the A/D bit analyzer 204 (and/or the TLB activity tracker 214) (block 505). That is, the CR3 tracker 206 is consulted to provide starting points for one or more walks of, for example, the guest page tables 120.

In the example of FIG. 5, the walker 202 is to walk the candidate guest page tables 120 to determine whether a corresponding linear address should be added to the address list 210 of FIG. 2. In the example of FIG. 5, the walker 202 analyzes the previously generated data structure to determine whether any more of the root guest page tables are to be walked (block 506). That is, the walker 202 determines whether all candidate guest page tables 120 of the data structure have already been walked. If there is no more root guest page tables 120 to walk, control proceeds to FIG. 7, which is described in detail below. Otherwise, for the next guest page table hierarchy to be walked and analyzed, the example A/D bit analyzer 204 determines whether the corresponding one of the EPT A/D bits 132 is set (block 508). If the corresponding one of the EPT A/D bits 132 is clear (i.e., not set) (block 508), the corresponding guest page table 120 and the descendents, if any, are skipped (block 510). Control proceeds to block 506.

However, if the corresponding one of the EPT A/D bits 132 is set (e.g., to '1') (block 508), the example walker 202 walks the entries of the guest page table 120 (block 512). If the entries reference a deeper one of the guest page tables 120 (block 514), the walker 202 recursively walks the deeper page table (block 516). Control proceeds to block 508. However, if walker 202 encounters an entry that does not reference a deeper guest page table 120 (e.g., an entry that maps a page rather than references another table) (block 514), one or more criteria is checked for that entry and if the criteria is/are met, the corresponding linear address is added to the example address list 210 of FIG. 2 (block 518). In the illustrated example of FIG. 5, the criteria checked is defined by the example A/D bit analyzer 204 and includes the corresponding guest A/D bit 130 being set and the corresponding EPT A/D bit 132 being set. As disclosed above, such criteria enable the example scanner 104 of FIG. 1 to focus on and/or restrict its operations to recently accessed memory. In the illustrated example of FIG. 5, to add the corresponding linear address to the address list 210, the example linear address identifier 208 determines the appropriate linear address and provides the determined linear address to the address list 210 (block 518). Further, in the example of FIG. 5, the adjacent address identifier 212 identifies one or more adjacent addresses in the linear address space and the identified linear address(es) are added to the address list 210 (block 520). Control proceeds to block 506.

Accordingly, in the example of FIG. 5, the scan manager 200 populates the example address list 210 of FIG. 2 with linear addresses that correspond to recently accessed memory according to information associated with the example address translation system 108 of FIG. 2.

Figure 6:
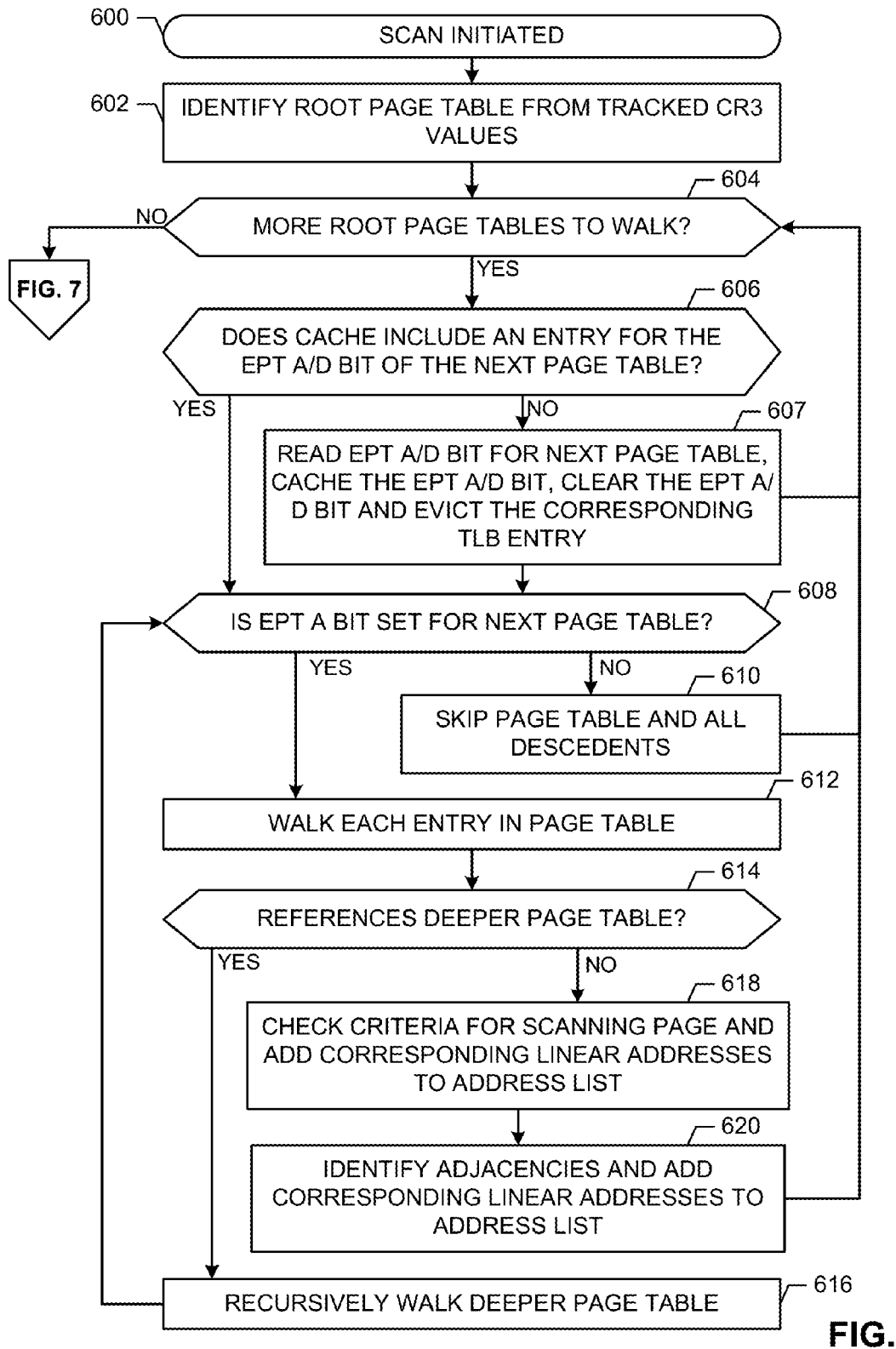
FIG. 6 is a flowchart representative of example machine readable instructions that may be executed to implement the example scan manager of FIGS. 1 and/or 2.

FIG. 6 illustrates an example process implemented by the example scan manager 106 of FIGS. 1 and/or 2 to identify recently accessed memory. The example of FIG. 6 begins with an initiation of the example scan manager 106 of FIGS. 1 and/or 2 (block 600). The example scan manager 106 is initiated in response to, for example, an instruction from the security application 102, a schedule, and/or one or more other triggers. In the example of FIG. 6, rather than accessing all of the EPTs 126 to determine which EPT A/D bits 132 are set and generating the data structure at an onset as in the example of FIG. 5, the example of FIG. 6 walks the EPTs 126 on demand for specific guest physical addresses pointed to by guest page table entries. In the example of FIG. 6, the CR3 tracker 206 provides location(s) of the root page table(s) of the guest page tables 120 that correspond to recently active threads, programs, etc. (block 602). That is, the CR3 tracker 206 is consulted to provide starting points for one or more walks of, for example, the guest page tables 120.

If there are root page tables to walk according to the CR3 tracker 206 (block 604), a cache maintained by, for example, the scanner 104 is checked to determine whether the cache includes an EPT A/D bit of the next page table (block 606). For example, the example walker 202 and/or the A/D bit analyzer 204 references the cache to determine if the cache includes a corresponding entry. If the cache does include the corresponding entry, that entry can be used to determine a value of the EPT A/D bit 132. In the example of FIG. 6, when the cache does not include an entry for the EPT A/D bit 132 of the next page table, the EPT A/D bit 132 is read, cached, and cleared (block 607). Further, the corresponding in the TLB 134 is evicted so that subsequent page table accesses will be detected and processed in subsequent scans (block 607).

In the example of FIG. 6, if the cache does not include an entry for the EPT A/D bit 132 of the next page table, the example A/D bit analyzer 204 determines whether the corresponding one of the EPT A/D bits 132 is set (block 608). In the example of FIG. 6, operations of blocks 608-616 are similar to the operations of blocks 508-516 of FIG. 5.

Accordingly, the example of FIG. 6 identifies particular page hierarchies of the address translation system 108 for candidates as indicators of recently accessed memory and walks the EPTs 126 in an on-demand manner. Alternatively, the example of FIG. 5 analyzes the EPT A/D bits 132 at an onset to generate a data structure to be used referenced during one or more walks of the page table hierarchies.

Figure 7:
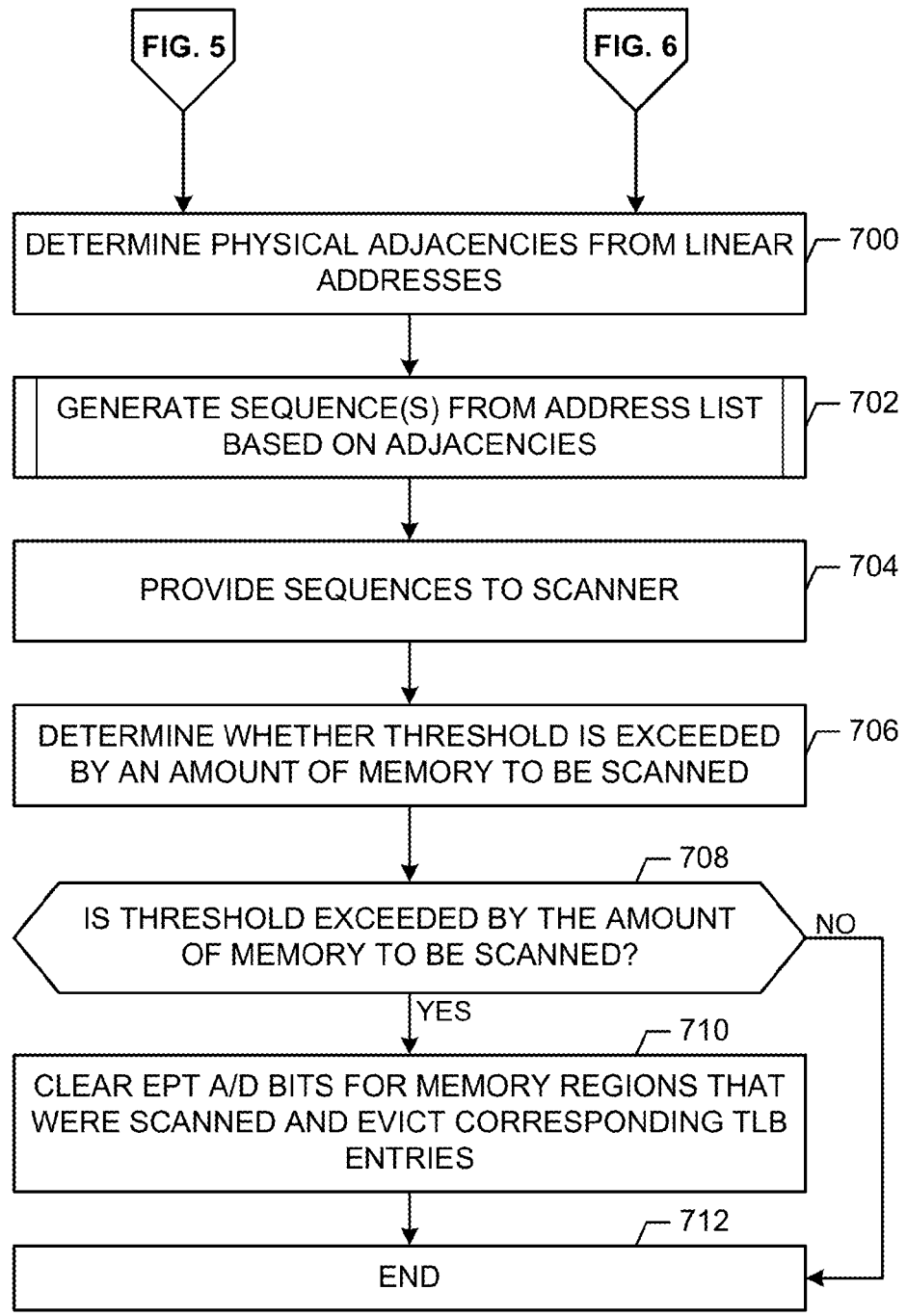
FIG. 7 is a flowchart representative of example machine readable instructions that may be executed to implement the example scan manager of FIGS. 1 and/or 2.

The example of FIG. 7 is arrived at from, for example, FIG. 5 and/or FIG. 6 as described above. In the illustrated example, when arrived at FIG. 7, the example address list 210 of FIG. 2 includes one or more linear addresses that corresponding to recently accessed memory and/or linear addresses determined to be adjacent to the linear address(es) corresponding to recently accessed memory. In the example of FIG. 7, the adjacency mapper 220 determines the physical addresses corresponding to the adjacent linear addresses from mappings between the linear addresses and physical addresses, as illustrated in FIG. 3 and disclosed above (block 700). Accordingly, the adjacency mapper 220 generates information indicative of which physical addresses should be scanned in sequence to cover, for example, page boundaries.

In the example of FIG. 7, the sequencer 222 uses the adjacency information to generate one or more sequences from the address list 210 (block 702). For example, the sequencer 222 identifiers particular addresses as corresponding to adjacencies and, for such addresses, designates a portion of the corresponding memory (e.g., not the entire memory region) for scanning. In some examples, the portion for the designation is determined based on whether the page boundary corresponding to a preceding or subsequent address. An example implementation of block 702 is disclosed below in connection with FIG. 8.

In the illustrated example, the sequencer 222 provides the one or more sequences to, for example, the scanner 104 of FIG. 1 (block 704). In the illustrated example, the clearer 216 determines whether a threshold amount of memory is set to be scanned by the scanner (block 706). For example, the clearer 216 determines whether the sequences provided to the scanner 104 via the sequencer 222 include more than a threshold number of addresses and/or more than a threshold amount of memory (e.g., bits) to scan. If the threshold has been exceeded (block 708), the example clearer 216 clear the A/D bits (e.g., the guest A/D bits 130 and/or the EPT A/D bits 132 of FIG. 1) for memory regions that are to be scanned and/or were scanned (block 710). Further, in the example of FIG. 7, the clearer 216 evicts any entries of the TLB 134 and/or entries in the log maintained by the TLB activity tracker 214 that correspond to addresses provided to the scanner 104 (block 710). If the threshold has not been exceeded (block 708), the example of FIG. 7 ends without the clearer 216 clearing the A/D bits and/or TLB information (block 712).

Figure 8:
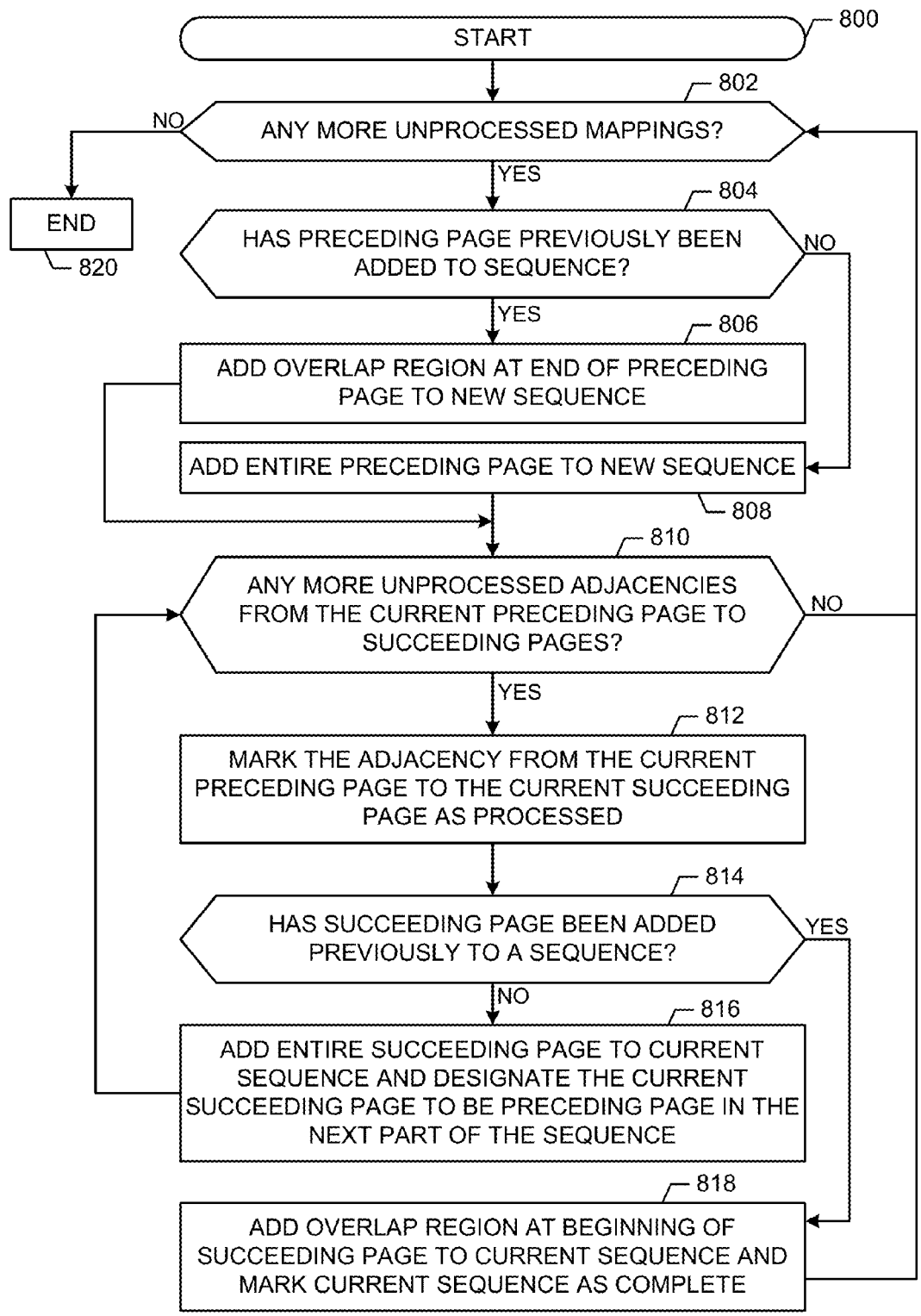
FIG. 8 is a flowchart representative of example machine readable instructions that may be executed to implement the example scan manager of FIGS. 1 and/or 2.

FIG. 8 begins in response to, for example, control arriving at block 702 of FIG. 7 (block 800). In the illustrated example of FIG. 8, the sequencer 222 of FIG. 2 is provided with mappings between linear addresses and physical address as illustrated in, for example, FIG. 3. The example sequencer 222 of FIG. 2 processes the mappings to generate one or more sequences to be provided to, for example, the scanner 104. If mappings remain unprocessed (block 802), the sequencer 222 processes a current page corresponding to a current unprocessed mapping. In some examples, the page being processed is identified by a corresponding physical address. In the example of FIG. 8, the sequencer 222 determines whether a preceding page (e.g., a page preceding the current page) has been added to a sequence yet (e.g., during a current iteration of the sequence generation) (block 804). If the preceding page was previously added to a sequence (block 804), the examples sequencer 222 adds a portion of the preceding page to the current sequence (block 806). The portion of the preceding page is referred to as an overlap region, as the portion is added to cover a page boundary. Otherwise, if the preceding page was not previously added to a sequence (block 804), the sequencer 222 adds the entire preceding page to the current sequence (block 808). Control proceeds to block 810.

If there are not more unprocessed adjacencies associated with the preceding page (block 810), control proceeds to block 802. Otherwise, if there is/are one or more unprocessed adjacencies to, for example, a succeeding page (block 810), the example sequencer 222 marks the adjacency from the current preceding page to the current succeeding page as processed (block 812). If the succeeding page has not been previously added to a sequence (block 814), the example sequencer 222 adds the entire succeeding page to the current sequence and designates the current succeeding page to be the preceding page in the next part of the sequence (block 816). Control proceeds to block 810. Otherwise, if the succeeding page has been previously added to a sequence (block 814), the example sequencer 222 adds a portion (e.g., an overlap region) at a beginning of the succeeding page to the current sequence and marks the current sequence as complete (block 818). Control proceeds to block 802. If no more mappings are left to process, the example of FIG. 8 ends (block 820).

As such, the example of FIG. 8 provides one or more sequences of physical addresses corresponding to regions of memory to be scanned in which redundancies are reduced and/or eliminated and amounts of memory scanned for purposes of covering page boundaries is reduced and/or minimized.

Figure 9:
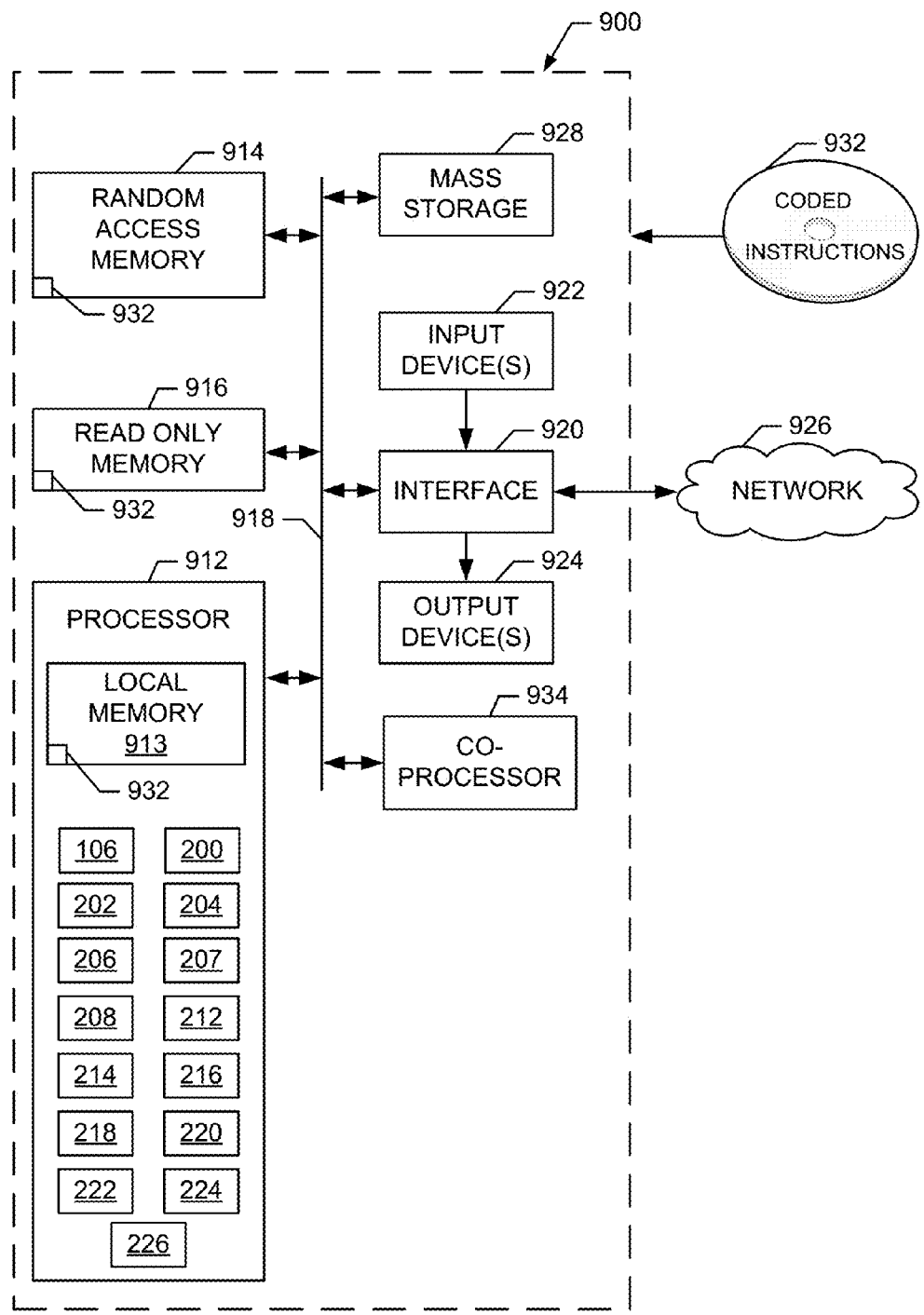
FIG. 9 is a block diagram of an example processing system implementing the example scan manager of FIGS. 1 and/or 2 by executing the example machine readable instructions of FIGS. 5, 6, 7 and/or 8.

FIG. 9 is a block diagram of an example processor platform 900 capable of executing the instructions of FIGS. 5, 6, 7, and/or 8 to implement the example scan manager 106 of FIGS. 1 and/or 2. The processor platform 900 can be, for example, a server, a personal computer, a mobile device (e.g., a cell phone, a smart phone, a tablet such as an iPad™), a personal digital assistant (PDA), an Internet appliance, a media player (e.g., a DVD player, a CD player, a digital video recorder, a Blu-ray player, etc.), a gaming console, or any other type of computing device.

The processor platform 900 of the illustrated example includes a processor 912 (e.g., the CPU 112 of FIG. 1) and a co-processor 934 (e.g., the GPU 115 of FIG. 1). The processor 912 and the co-processor 934 of the illustrated example are hardware. For example, the processor 912 and/or the co-processor 934 can be implemented by one or more integrated circuits, logic circuits, microprocessors or controllers from any desired family or manufacturer. In some examples, the processor 912 and/or the co-processor 934 implements the example scan manager 106 of FIGS. 1 and/or 2, the example target memory identifier 200 of FIG. 2, the example walker 202 of FIG. 2, the example A/D bit analyzer 204 of FIG. 2, the example CR3 tracker 206 of FIG. 2, the example page table identifier 207 of FIG. 2, the example address identifier 208 of FIG. 2, the example adjacent address identifier 212 of FIG. 2, the example TLB activity tracker 214 of FIG. 2, the example clearer 216 of FIG. 2, the example scan target outputter 218 of FIG. 2, the example adjacency mapper 220 of FIG. 2, the example sequencer 222 of FIG. 2, the example protection assignor 224 of FIG. 2 and/or the example workload offloader 226 of FIG. 2.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor (e.g., the example GPU 115 of FIG. 1).

The interface circuit 920 of the illustrated example also includes a communication device such as a transmitter, a receiver, a transceiver, a modem and/or network interface card to facilitate exchange of data with external machines via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 of FIGS. 5-8 may be stored in the mass storage device 928, in the volatile memory 914, in the non-volatile memory 916, and/or on a removable tangible computer readable storage medium such as a CD or DVD.

An example disclosed apparatus includes a walker to traverse a paging structure of an address translation system; a bit analyzer to determine whether a bit associated with an entry of the paging structure is indicative of the entry being recently accessed; an address identifier to, when the bit analyzer determines that the bit associated with the entry of the paging structure is indicative of the entry being recently accessed, determine an address associated with the entry; and an outputter to provide the determined address to a memory scanner, wherein at least one of the walker, the bit analyzer, the address identifier, or the outputter is implemented via a logic circuit.

In some disclosed examples, the memory scanner is to restrict a memory scan to recently accessed memory.

In some disclosed examples, the apparatus further includes a register value tracker to determine a recent value of a register indicative of a root portion of the paging structure.

In some disclosed examples, the walker is to use the recent value of the register to select a hierarchy of the paging structure to traverse.

In some disclosed examples, the address associated with the entry is a first address, and the apparatus further includes an adjacent address identifier to identify a second address adjacent to the first address.

In some disclosed examples, the outputter is to provide the second address to the memory scanner in association with the first address.

In some disclosed examples, the apparatus further includes a sequencer to define an association between the first address and the second address to indicate a sequence between the first and second addresses.

In some disclosed examples, the apparatus further includes a clearer to clear the bit when the bit analyzer determines that the bit is indicative of the entry being recently accessed.

In some disclosed examples, the apparatus further includes a buffer activity tracker to identify a mapping of a buffer as corresponding to recently accessed memory, wherein the address identifier is to determine a second address from information of the mapping, and the outputter is to provide the second address to the memory scanner.

In some disclosed examples, the apparatus further includes a protection assignor to determine a first protection domain under which a first one of the walker, the bit analyzer, the address identifier, the outputter, or the memory scanner is to operate, and to determine a second protection domain under which a second one of the walker, the bit analyzer, the address identifier, the outputter, or the memory scanner is to operate.

In some disclosed examples, the apparatus further includes a workload offloader to select the first processing component to implement a first one of the walker, the bit analyzer, the outputter, or the memory scanner, and to select the second processing component different than the first processing component to implement a second one of the walker, the bit analyzer, the outputter or the memory scanner.

In some disclosed examples, the protection assignor is to remap virtual addresses via translation tables to facilitate access of the second processing component under the second domain.

In some disclosed examples, the apparatus further includes a page table identifier to: scan memory for a page having a format indicative of a page table structure; and when the page having the format indicative of the page table structure is found, provide identifying information associated with the page to the walker.

In some disclosed examples, the bits including the bit are maintained in a plurality of extended page table hierarchies, and the apparatus further includes a hypervisor to periodically clear the bits to enable a guest to switch to one of the extended page table hierarchies having clear bits.

In some disclosed examples, the apparatus further includes a virtual machine monitor to shadow the paging structure to generate a first copy of the paging structure as modified by a guest, wherein the first copy is separate from a second copy of the paging structure that is referenced by a control register and used to insert entries into a buffer.

An example disclosed method including traversing a paging structure of an address translation system; determining, via a logic circuit, whether a bit associated with an entry of the paging structure is indicative of the entry being recently accessed; and when the bit associated with the entry of the paging structure is indicative of the entry being recently accessed determining, via the logic circuit, an address associated with the entry, and providing the determined address to a memory scanner.

In some disclosed examples, the memory scanner is to restrict a memory scan to recently accessed memory.

In some disclosed examples, the method further includes determining a recent value of a register indicative of a root portion of the paging structure.

In some disclosed examples, the method further includes using the recent value of the register to select a hierarchy of the paging structure to traverse.

In some disclosed examples, the address associated with the entry is a first address, and the method further includes identifying a second address adjacent to the first address.

In some disclosed examples, the method further includes providing the second address to the memory scanner in association with the first address.

In some disclosed examples, the method further includes defining an association between the first address and the second address to indicate a sequence between the first and second addresses.

In some disclosed examples, the method further includes clearing the bit when the bit is indicative of the entry being recently accessed.

In some disclosed examples, the method further includes identifying a mapping of a buffer as corresponding to recently accessed memory; determining a second address from information of the mapping; and providing the second address to the memory scanner.

In some disclosed examples, the method further includes determining a first protection domain for a first one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner, and determining a second protection domain different from the first protection domain for a second one of the traversing of the paging structure, the determining whether the bit associated with the entry of the paging structure is indicative of the entry being recently accessed, the determining of the address associated with the entry, the providing of the determined address to the memory scanner, or the scanning of memory by the memory scanner.

In some disclosed examples, the method further includes selecting a first processing component to implement the first one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner, and selecting a second processing component different than the first processing component to implement the second one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner.

In some disclosed examples, the method further includes remapping virtual addresses via translation tables to facilitate access of the second processing component under the second domain.

In some disclosed examples, the method further includes scanning memory for a page having a format indicative of a page table structure; and when the page having the format indicative of the page table structure is found, providing identifying information associated with the page to the walker.

In some disclosed examples, bits including the bit are maintained in a plurality of extended page table hierarchies, and the method further includes periodically clearing the bits to enable a guest to switch to one of the extended page table hierarchies having clear bits.

In some disclosed examples, the method further includes shadowing, via a virtual machine monitor, the paging structure to generate a first copy of the paging structure as modified by a guest, wherein the first copy is separate from a second copy of the paging structure that is referenced by a control register and used to insert entries into a buffer.

An example disclosed tangible computer readable medium comprises instructions that, when executed, cause machine to at least traverse a paging structure of an address translation system; determine whether a bit associated with an entry of the paging structure is indicative of the entry being recently accessed; and when the bit associated with the entry of the paging structure is indicative of the entry being recently accessed determine an address associated with the entry; and provide the determined address to a memory scanner.

In some disclosed examples, the memory scanner is to restrict a memory scan to recently accessed memory.

In some disclosed examples, the instructions, when executed, cause the machine to determine a recent value of a register indicative of a root portion of the paging structure.

In some disclosed examples, the instructions, when executed, cause the machine to use the recent value of the register to select a hierarchy of the paging structure to traverse.

In some disclosed examples, the address associated with the entry is a first address, and the instructions, when executed, cause the machine to identify a second address adjacent to the first address.

In some disclosed examples, the instructions, when executed, cause the machine to provide the second address to the memory scanner in association with the first address.

In some disclosed examples, the instructions, when executed, cause the machine to define an association between the first address and the second address to indicate a sequence between the first and second addresses.

In some disclosed examples, the instructions, when executed, cause the machine to clear the bit when the bit is indicative of the entry being recently accessed.

In some disclosed examples, the instructions, when executed, cause the machine to identify a mapping of a buffer as corresponding to recently accessed memory; determine a second address from information of the mapping; and provide the second address to the memory scanner.

In some disclosed examples, the instructions, when executed, cause the machine to determine a first protection domain for a first one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner, and determine a second protection domain different from the first protection domain for a second one of the traversing of the paging structure, the determining whether the bit associated with the entry of the paging structure is indicative of the entry being recently accessed, the determining of the address associated with the entry, the providing of the determined address to the memory scanner, or the scanning of memory by the memory scanner.

In some disclosed examples, the instructions, when executed, cause the machine to select a first processing component to implement the first one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner, and select a second processing component different than the first processing component to implement the second one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner.

In some disclosed examples, the instructions, when executed, cause the machine to remap virtual addresses via translation tables to facilitate access of the second processing component under the second domain.

In some disclosed examples, the instructions, when executed, cause the machine to: scan memory for a page having a format indicative of a page table structure; and when the page having the format indicative of the page table structure is found, provide identifying information associated with the page to the walker.

In some disclosed examples, bits including the bit are maintained in a plurality of extended page table hierarchies, and the instructions, when executed, cause the machine to periodically clear the bits to enable a guest to switch to one of the extended page table hierarchies having clear bits.

In some disclosed examples, the instructions, when executed, cause the machine to shadow, via a virtual machine monitor, the paging structure to generate a first copy of the paging structure as modified by a guest, wherein the first copy is separate from a second copy of the paging structure that is referenced by a control register and used to insert entries into a buffer.

An example disclosed scan manager includes means to traverse a paging structure of an address translation system; means to determine whether a bit associated with an entry of the paging structure is indicative of the entry being recently accessed; means to, when the bit associated with the entry of the paging structure is indicative of the entry being recently accessed, determine an address associated with the entry; and means to, when the bit associated with the entry of the paging structure is indicative of the entry being recently accessed, provide the determined address to a memory scanner.

In some disclosed examples, the memory scanner is to restrict a memory scan to recently accessed memory.

In some disclosed examples, the scan manager further includes means to determine a recent value of a register indicative of a root portion of the paging structure.

In some disclosed examples, the means to traverse the paging structure is to use the recent value of the register to select a hierarchy of the paging structure to traverse.

In some disclosed examples, the address associated with the entry is a first address, and the scan manager further includes means to identify a second address adjacent to the first address.

In some disclosed examples, the scan manager further includes means to provide the second address to the memory scanner in association with the first address.

In some disclosed examples, the scan manager further includes means to define an association between the first address and the second address to indicate a sequence between the first and second addresses.

In some disclosed examples, the scan manager further includes means to clear the bit when the bit is indicative of the entry being recently accessed.

In some disclosed examples, the scan manager further includes means to identify a mapping of a buffer as corresponding to recently accessed memory, wherein the means to determine the first address is to determine a second address from information of the mapping, and wherein the means to provide the second address to the memory scanner is to provide the second address to the memory scanner.

In some disclosed examples, the scan manager further includes means to determine a first protection domain for a first one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner, and determine a second protection domain different from the first protection domain for a second one of the traversing of the paging structure, the determining whether the bit associated with the entry of the paging structure is indicative of the entry being recently accessed, the determining of the address associated with the entry, the providing of the determined address to the memory scanner, or the scanning of memory by the memory scanner.

In some disclosed examples, the scan manager further includes means to select a first processing component to implement the first one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner, and select the second processing component different than the first processing component to implement a second one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner.

In some disclosed examples, the means to determine the first protection domain and to determine the second protection domain is to remap virtual addresses via translation tables to facilitate access of the second processing component under the second domain.

In some disclosed examples, the scan manager further includes means to: scan memory for a page having a format indicative of a page table structure; and when the page having the format indicative of the page table structure is found, provide identifying information associated with the page to the walker.

In some disclosed examples, wherein bits including the bit are maintained in a plurality of extended page table hierarchies, and the scan manager further includes means to periodically clear the bits to enable guest software to switch to one of the extended page table hierarchies having clear bits.

In some disclosed examples, the scan manager further includes means to shadow the paging structure to generate a first copy of the paging structure as modified by a guest, wherein the first copy is separate from a second copy of the paging structure that is referenced by a control register and used to insert entries into a buffer.

An example disclosed apparatus includes an adjacency mapper to identify mappings between linear addresses and corresponding physical addresses; and a sequencer to generate, based on an order of the linear addresses, a sequence including first and second ones of the physical addresses ordered such that a boundary between regions of memory corresponding to the first and second ones of the physical addresses is scanned during a memory scan associated with the linear addresses, wherein at least one of the adjacency mapper or the sequencer is implemented via a logic circuit.

In some disclosed examples, the sequencer is to include only a first portion of the second one of the physical addresses in the sequence.

In some disclosed examples, the sequence is a first sequence, and the sequencer is to include a second portion of the second one of the physical addresses in a second sequence.

In some disclosed examples, a size of the portion is based on a page size.

In some disclosed examples, the sequence is a first sequence, and the sequencer is to exclude the second one of the physical addresses from a second sequence based on the second one of the physical addresses being in the first sequence.

An example disclosed method includes identifying, via a logic circuit, mappings between linear addresses and corresponding physical addresses; and generating, via the logic circuit, based on an order of the linear addresses, a sequence including first and second ones of the physical addresses ordered such that a boundary between regions of memory corresponding to the first and second ones of the physical addresses is scanned during a memory scan associated with the linear addresses.

In some disclosed examples, the generating of the sequence further includes incorporating only a first portion of the second one of the physical addresses in the sequence.

In some disclosed examples, the sequence is a first sequence, and the method further includes incorporating a second portion of the second one of the physical addresses in a second sequence.

In some disclosed examples, a size of the portion is based on a page size.

In some disclosed examples, the sequence is a first sequence, and the method further includes excluding the second one of the physical addresses from a second sequence based on the second one of the physical addresses being in the first sequence.

An example disclosed tangible computer readable medium comprising instructions that, when executed, cause machine to at least identify mappings between linear addresses and corresponding physical addresses; and generate, based on an order of the linear addresses, a sequence including first and second ones of the physical addresses ordered such that a boundary between regions of memory corresponding to the first and second ones of the physical addresses is scanned during a memory scan associated with the linear addresses.

In some disclosed examples, the instructions, when executed, cause the machine to include only a first portion of the second one of the physical addresses in the sequence.

In some disclosed examples, the sequence is a first sequence, and the instructions, when executed, cause the machine to include a second portion of the second one of the physical addresses in a second sequence.

In some disclosed examples, a size of the portion is based on a page size.

In some disclosed examples, the sequence is a first sequence, and the instructions, when executed, cause the machine to exclude the second one of the physical addresses from a second sequence based on the second one of the physical addresses being in the first sequence.

An example disclosed scan manager includes means to identify mappings between linear addresses and corresponding physical addresses; and means to generate, based on an order of the linear addresses, a sequence including first and second ones of the physical addresses ordered such that a boundary between regions of memory corresponding to the first and second ones of the physical addresses is scanned during a memory scan associated with the linear addresses.

In some disclosed examples, the means to generate the sequence is to include only a first portion of the second one of the physical addresses in the sequence.

In some disclosed examples, the sequence is a first sequence, and the means to generate the first sequence is to include a second portion of the second one of the physical addresses in a second sequence.

In some disclosed examples, a size of the portion is based on a page size.

In some disclosed examples, the sequence is a first sequence, and the means to generate the first sequence is to exclude the second one of the physical addresses from a second sequence based on the second one of the physical addresses being in the first sequence.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An apparatus, comprising:
a walker to traverse a paging structure of an address translation system;
a bit analyzer to determine whether a bit associated with an entry of the paging structure is indicative of the entry being recently accessed;
an address identifier to, when the bit analyzer determines that the bit associated with the entry of the paging structure is indicative of the entry being recently accessed, determine whether the entry of the paging structure maps a page of physical memory instead of mapping to another paging structure, and, if the entry maps a page of physical memory, determine an address corresponding to the physical memory; and
an outputter to provide the determined address to a memory scanner to scan a memory location associated with the address for malware, wherein at least one of the walker, the bit analyzer, the address identifier, or the outputter is implemented via a logic circuit.

2. The apparatus as defined in claim 1, wherein the memory scanner is to restrict a memory scan to recently accessed memory.

3. The apparatus as defined in claim 1, further including a register value tracker to determine a recent value of a register indicative of a root portion of the paging structure.

4. The apparatus as defined in claim 3, wherein the walker is to use the recent value of the register to select a hierarchy of the paging structure to traverse.

5. The apparatus as defined in claim 1, wherein the address associated with the entry is a first address, and further including an adjacent address identifier to identify a second address adjacent to the first address.

6. The apparatus as defined in claim 5, wherein the outputter is to provide the second address to the memory scanner in association with the first address.

7. The apparatus as defined in claim 1, further including a buffer activity tracker to identify a mapping of a buffer as corresponding to recently accessed memory, wherein the address identifier is to determine a second address from information of the mapping, and the outputter is to provide the second address to the memory scanner.

8. The apparatus as defined in claim 1, further including a protection assignor to:
  determine a first protection domain under which a first one of the walker, the bit analyzer, the address identifier, the outputter, or the memory scanner is to operate; and
  determine a second protection domain under which a second one of the walker, the bit analyzer, the address identifier, the outputter, or the memory scanner is to operate.

9. An apparatus, comprising:
  a walker to traverse a paging structure of an address translation system;
  a bit analyzer to determine whether a bit associated with an entry of the paging structure is indicative of the entry being recently accessed;
  an address identifier to, when the bit analyzer determines that the bit associated with the entry of the paging structure is indicative of the entry being recently accessed, associated with the entry;
  an outputter to provide the determined address to a memory scanner to scan a memory location associated with the address for malware, wherein at least one of the walker, the bit analyzer, the address identifier, or the outputter is implemented via a logic circuit;
  a protection assignor to:
    determine a first protection domain under which a first one of the walker, the bit analyzer, the address identifier, the outputter, or the memory scanner is to operate; and
    determine a second protection domain under which a second one of the walker, the bit analyzer, the address identifier, the outputter, or the memory scanner is to operate; and
  a workload offloader to:
    select a first processing component to implement the first one of the walker, the bit analyzer, the outputter, or the memory scanner; and
    select a second processing component different than the first processing component to implement the second one of the walker, the bit analyzer, the outputter or the memory scanner.

10. The apparatus as defined in claim 9, wherein the protection assignor is to remap virtual addresses via translation tables to facilitate access of the second processing component under the second domain.

11. A method, comprising:
  traversing, by executing an instruction with a processor, a paging structure of an address translation system;
  determining, by executing an instruction with a processor, whether a bit associated with an entry of the paging structure is indicative of the entry being recently accessed; and
  when the bit associated with the entry of the paging structure is indicative of the entry being recently accessed:
    determining, by executing an instruction with the processor, whether the entry of the paging structure maps a page of physical memory and, if the entry maps a page of physical memory instead of mapping to another paging structure, determining an address corresponding to the physical memory; and
    providing, by executing an instruction with a processor, the determined address to a memory scanner to scan the address for malware.

12. The method as defined in claim 11, wherein the memory scanner is to restrict a memory scan to recently accessed memory.

13. The method as defined in claim 11, further including clearing the bit when the bit is indicative of the entry being recently accessed.

14. The method as defined in claim 11, further including:
  identifying a mapping of a buffer as corresponding to recently accessed memory;
  determining a second address from information of the mapping; and
  providing the second address to the memory scanner.

15. At least one tangible computer readable medium comprising instructions that, when executed, cause a machine to at least:
  traverse a paging structure of an address translation system;
  determine whether a bit associated with an entry of the paging structure is indicative of the entry being recently accessed; and
  when the bit associated with the entry of the paging structure is indicative of the entry being recently accessed:
  determine whether the entry of the paging structure maps a page of physical memory and, when the entry maps a page of physical memory instead of mapping to another paging structure, determine an address corresponding to the physical memory; and
  provide the determined address to a memory scanner to scan the address for malware.

16. The at least one tangible computer readable medium as defined in claim 15, wherein the memory scanner is to restrict a memory scan to recently accessed memory.

17. The at least one tangible computer readable medium as defined in claim 15, wherein the instructions, when executed, cause the machine to determine a recent value of a register indicative of a root portion of the paging structure.

18. The at least one tangible computer readable medium as defined in claim 17, wherein the instructions, when executed, cause the machine to use the recent value of the register to select a hierarchy of the paging structure to traverse.

19. The at least one tangible computer readable medium as defined in claim 15, wherein the address associated with the entry is a first address, and the instructions, when executed, cause the machine to identify a second address adjacent to the first address.

20. The at least one tangible computer readable medium as defined in claim 19, wherein the instructions, when executed, cause the machine to provide the second address to the memory scanner in association with the first address.

21. The at least one tangible computer readable medium as defined in claim 15, wherein the instructions, when executed, cause the machine to:
  determine a first protection domain for a first one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner; and determine a second protection domain different from the first protection domain for a second one of the traversing of the paging structure, the determining whether the bit associated with the entry of the paging structure is indicative of the entry being recently accessed, the determining of the address associated with the entry, the providing of the determined address to the memory scanner, or the scanning of memory by the memory scanner.

22. The at least one tangible computer readable medium as defined in claim 15, wherein the instructions, when executed, cause the machine to:
   scan memory for a page having a format indicative of a page table structure; and
   when the page having the format indicative of the page table structure is found, provide identifying information associated with the page to the walker.

23. The at least one tangible computer readable medium as defined in claim 15, wherein bits including the bit are maintained in a plurality of extended page table hierarchies, and wherein the instructions, when executed, cause the machine to periodically clear the bits to enable a guest to switch to one of the extended page table hierarchies having clear bits.

24. At least one tangible computer readable medium comprising instructions that, when executed, cause a machine to at least:
   traverse a paging structure of an address translation system;
   determine whether a bit associated with an entry of the paging structure is indicative of the entry being recently accessed; and
   when the bit associated with the entry of the paging structure is indicative of the entry being recently accessed:
      determine an address associated with the entry;
      provide the determined address to a memory scanner to scan the address;
      determine a first protection domain for a first one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner;
      determine a second protection domain different from the first protection domain for a second one of the traversing of the paging structure, the determining whether the bit associated with the entry of the paging structure is indicative of the entry being recently accessed, the determining of the address associated with the entry, the providing of the determined address to the memory scanner, or the scanning of memory by the memory scanner;
      select a first processing component to implement the first one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner; and
      select a second processing component different than the first processing component to implement the second one of the traversing of the paging structure, the determining whether the bit associated with the entry of the paging structure is indicative of the entry being recently accessed, the determining of the address associated with the entry, the providing of the determined address to the memory scanner, or a scanning of memory by the memory scanner.

25. The at least one tangible computer readable medium as defined in claim 24, wherein the instructions, when executed, cause the machine to remap virtual addresses via translation tables to facilitate access of the second processing component under the second domain.

* * * * *